(12) United States Patent
Kobayashi et al.

(10) Patent No.: US 11,595,584 B2
(45) Date of Patent: Feb. 28, 2023

(54) IMAGING APPARATUS, METHOD OF CONTROLLING IMAGING APPARATUS AND COMPUTER-READABLE MEDIUM

(71) Applicant: CANON KABUSHIKI KAISHA, Tokyo (JP)

(72) Inventors: Satoru Kobayashi, Tokyo (JP); Fumitaka Nakayama, Kanagawa (JP); Hiroshi Suzuki, Kanagawa (JP); Hiroki Okino, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/351,517

(22) Filed: Jun. 18, 2021

(65) Prior Publication Data

US 2021/0400207 A1 Dec. 23, 2021

(30) Foreign Application Priority Data

Jun. 23, 2020 (JP) .............................. JP2020-107743
Jan. 26, 2021 (JP) .............................. JP2021-010633

(51) Int. Cl.
*H04N 5/232* (2006.01)
*H04N 5/77* (2006.01)

(52) U.S. Cl.
CPC ... *H04N 5/232935* (2018.08); *H04N 5/23216* (2013.01); *H04N 5/772* (2013.01)

(58) Field of Classification Search
CPC ......... H04N 5/232935; H04N 5/23216; H04N 5/772; H04N 5/232939; H04N 5/2353; H04N 5/23293; H04N 5/23212; H04N 5/23222; H04N 5/232933; H04N 1/00453; H04N 1/00442
See application file for complete search history.

(56) References Cited

U.S. PATENT DOCUMENTS

| | | | |
|---|---|---|---|
| 2005/0088542 A1* | 4/2005 | Stavely ................... | G06T 11/60 348/E5.042 |
| 2006/0050151 A1* | 3/2006 | Fujinawa ............ | H04N 1/00442 348/E5.025 |
| 2015/0326790 A1* | 11/2015 | Shimamura ...... | H04N 5/232935 348/333.05 |
| 2016/0227108 A1* | 8/2016 | Yokokawa ....... | H04N 5/232939 |

FOREIGN PATENT DOCUMENTS

| | | |
|---|---|---|
| EP | 1633131 A2 | 3/2006 |
| EP | 2953345 A1 | 12/2015 |
| JP | 2017-116872 A | 6/2017 |

OTHER PUBLICATIONS

The above patent document was cited in a European Search Report dated Nov. 19, 2021, that issued in the corresponding European Patent Application No. 21178928.4.

* cited by examiner

*Primary Examiner* — Nelson D. Hernández Hernández
(74) *Attorney, Agent, or Firm* — Cowan, Liebowitz & Latman, P.C.

(57) ABSTRACT

An imaging apparatus includes: a display unit configured to display on a display a live image of a subject and previously captured images; an image capturing unit configured to capture an image of the subject; and a recording unit configured to record in a recording medium the captured image of the subject which has been captured by the image capturing unit and the previously captured images in association with disposition information which includes a display position of the captured image of the subject and display positions of the previously captured images.

19 Claims, 19 Drawing Sheets

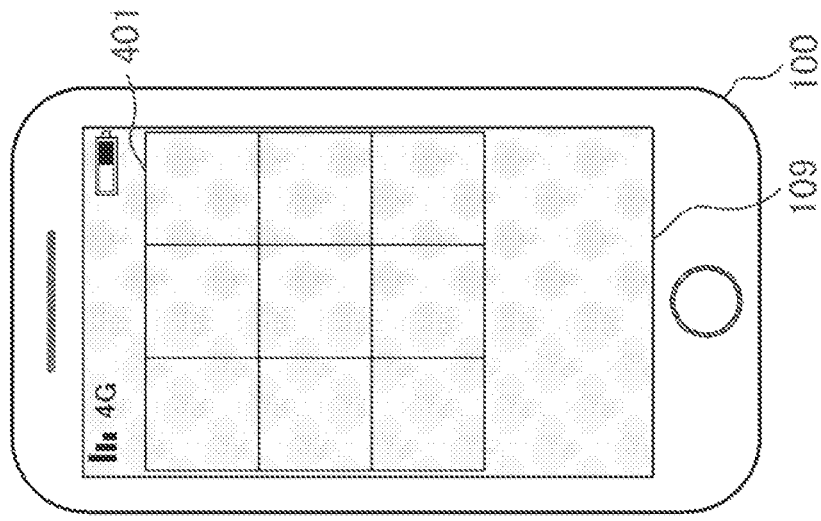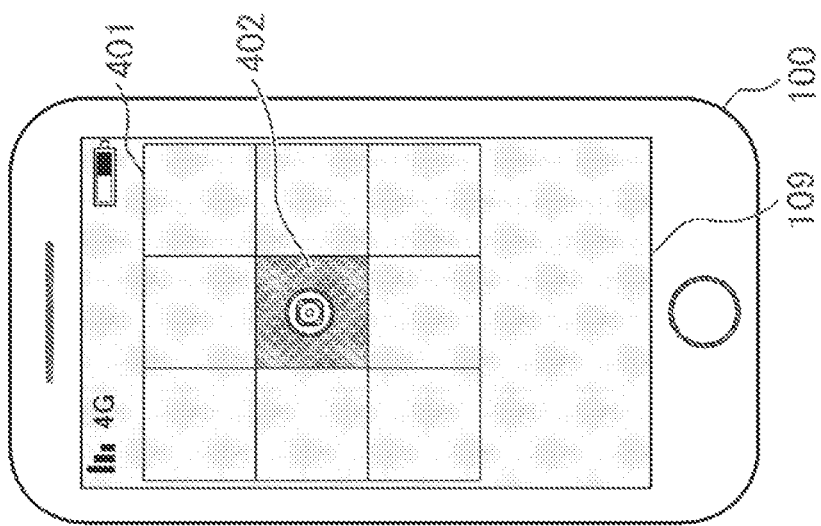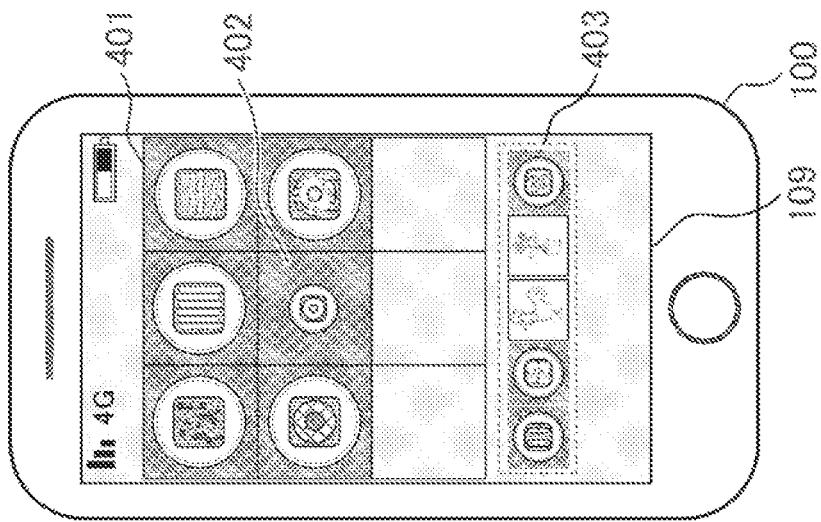

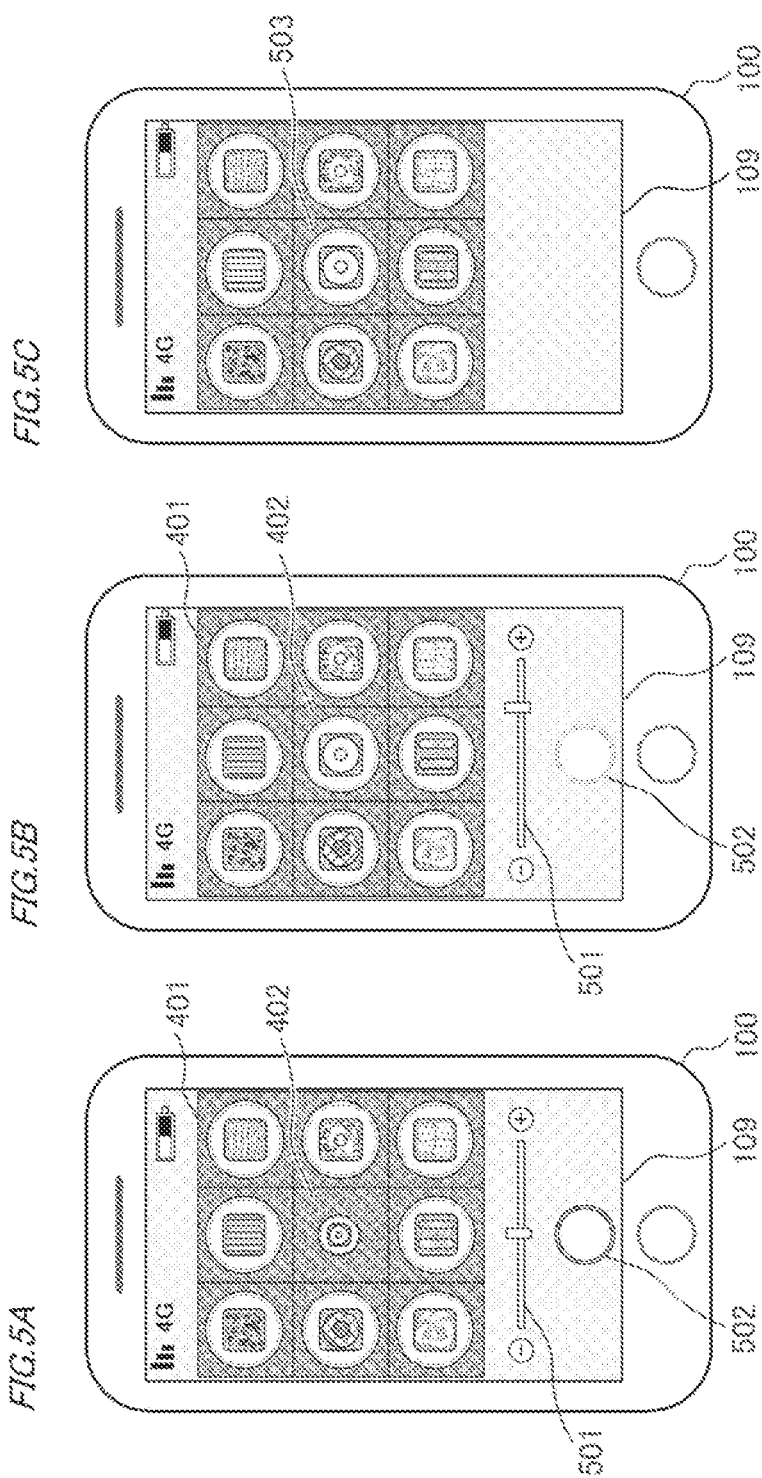

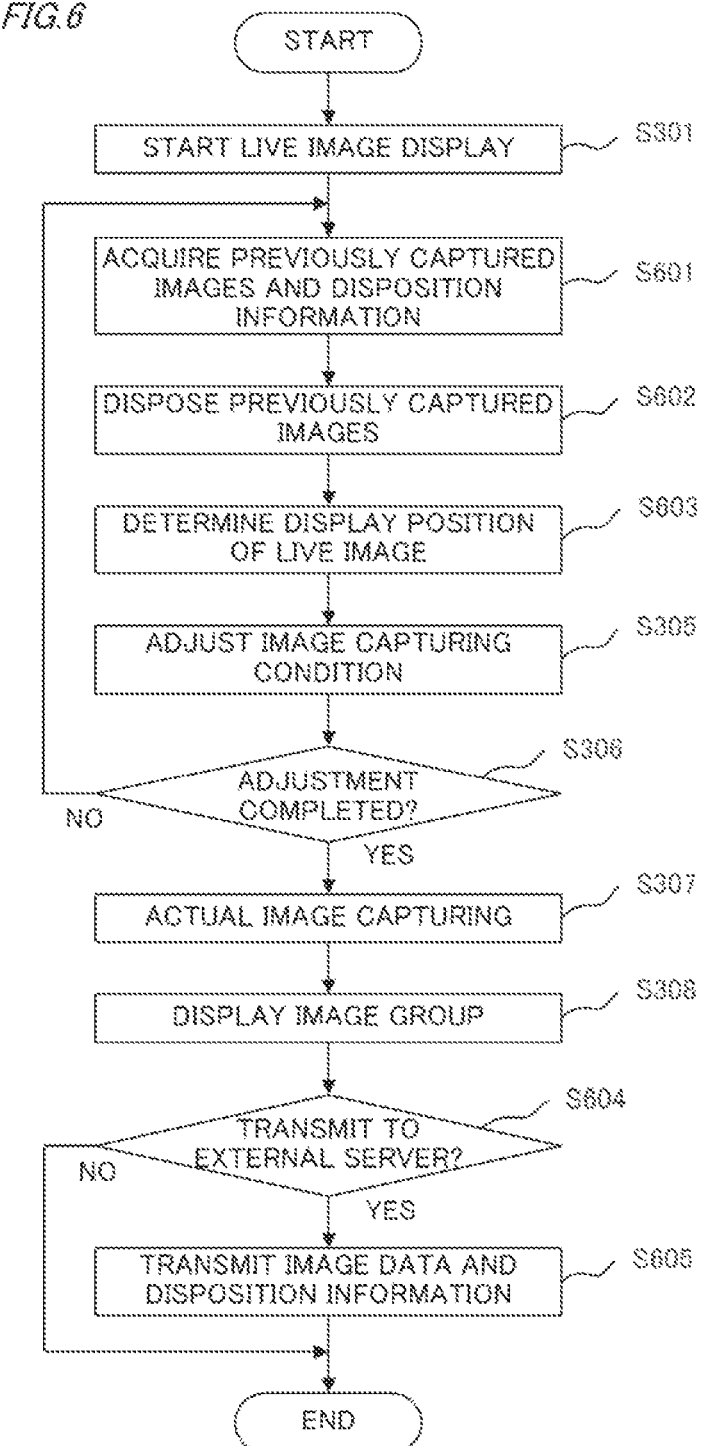

FIG.8

IMAGE FEATURE INFORMATION
├── COMPOSITION: CENTERED COMPOSITION
├── TINGE: #E3E9DF, #DA4011
└── SUBJECT: COOKING

FIG.13A
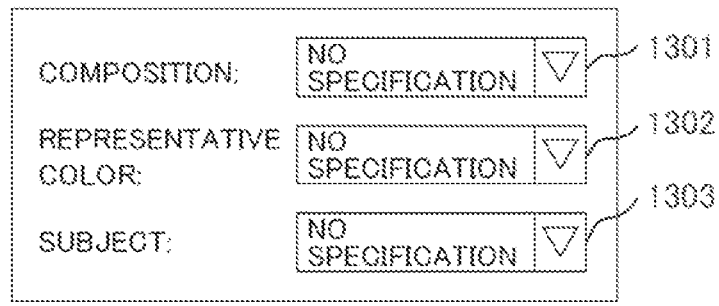
FIG.13B
CENTERED COMPOSITION
RULE OF SYMMETRY (VERTICAL)
RULE OF SYMMETRY (HORIZONTAL)
RULE OF THIRDS (VERTICAL)
RULE OF THIRDS (HORIZONTAL)
DIAGONAL COMPOSITION
...
FIG.13C
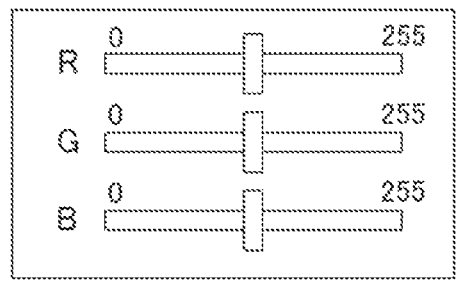
FIG.13D
PERSON
ANIMAL
COOKING
LANDSCAPE
FLOWER
...

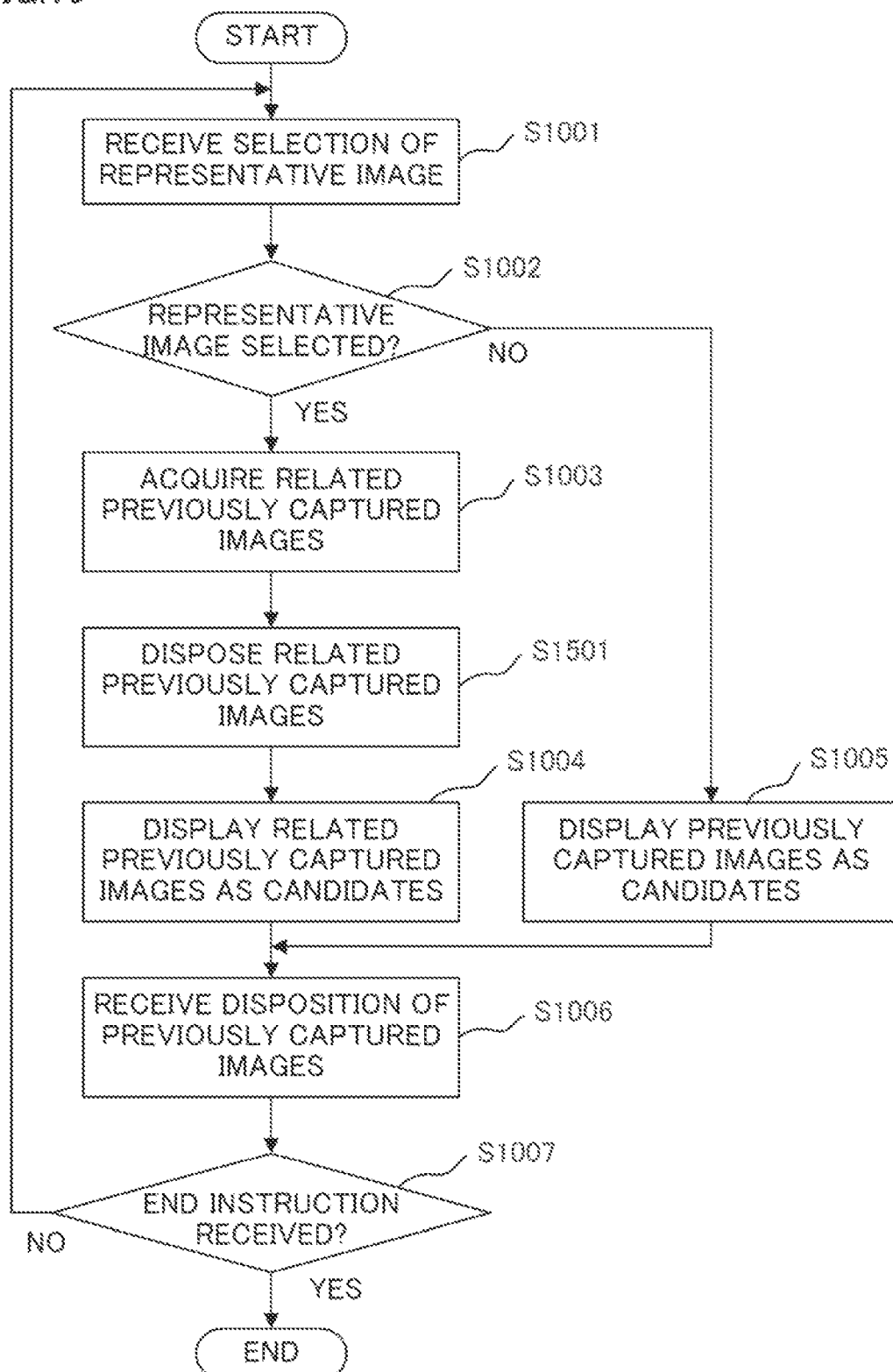

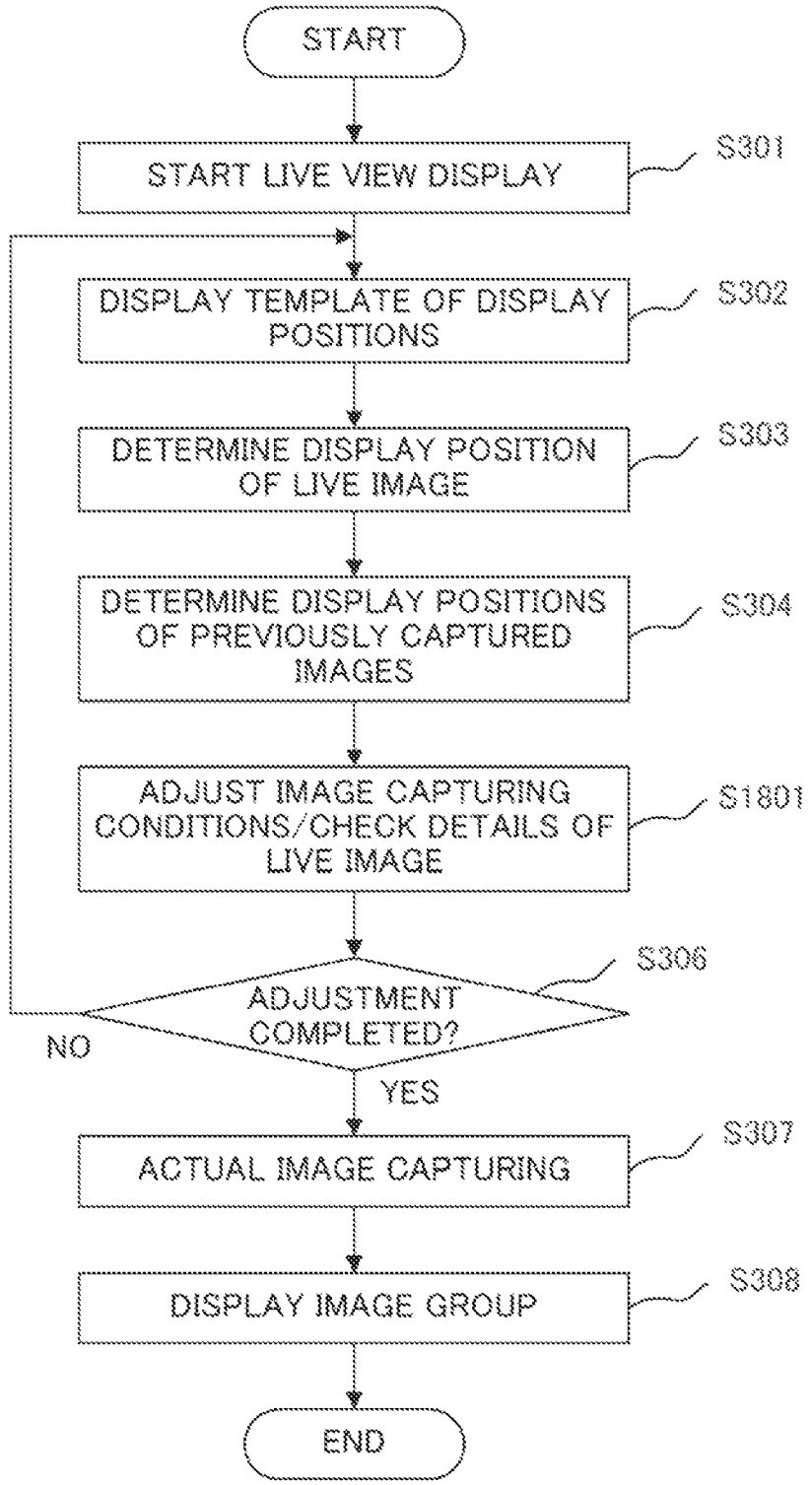

IMAGING APPARATUS, METHOD OF CONTROLLING IMAGING APPARATUS AND COMPUTER-READABLE MEDIUM

BACKGROUND OF THE INVENTION

Field of the Invention

The present invention relates to an imaging apparatus, a method of controlling the imaging apparatus, and a computer-readable medium.

Description of the Related Art

In recent years, a plurality of images posted on a social network service (SNS) or the like can be viewed in a list display. In a case where a subject, composition, brightness, tinge and the like are similar among the plurality of images displayed in the list, a sense of consistency and favorable impression can be provided visually.

As a technique of capturing a plurality of images, Japanese Patent Application Publication No. 2017-116872 discloses a technique in which a recapturing target image and a live image, which is a moving image that is currently being captured, are displayed side-by-side to allow a pose or facial expression to be made during image capturing while a user checks the recapturing target image.

However, even if a live view image, which is a moving image that is currently being captured, is displayed with a previously captured image side-by-side, it may take time and efforts, such as recapturing images with changing the pose and position of the subject, in order to capture an image consistent with the previously captured image.

SUMMARY OF THE INVENTION

The present invention provides an imaging apparatus that can easily generate an image group including a plurality of images having a sense of consistency.

An imaging apparatus according to the present invention includes: a display unit configured to display on a display a live image of a subject and previously captured images; an image capturing unit configured to capture an image of the subject; and a recording unit configured to record in a recording medium the captured image of the subject which has been captured by the image capturing unit and the previously captured images in association with disposition information which includes a display position of the captured image of the subject and display positions of the previously captured images.

Further features of the present invention will become apparent from the following description of exemplary embodiments with reference to the attached drawings.

BRIEF DESCRIPTION OF THE DRAWINGS

FIGS. 4A to 4C are diagrams for describing the disposition of a live image and previously captured images;

FIGS. 5A to 5C are diagrams for describing the adjustment of the live image;

FIG. 6 is a flow chart exemplifying the image capturing processing according to Embodiment 2;

FIG. 8 is a diagram exemplifying the meta data indicating the feature of the image according to Embodiment 3;

FIGS. 13A to 13D are diagrams exemplifying the UI according to Embodiment 4;

FIG. 15 is a flow chart exemplifying the previously captured image disposition processing according to Embodiment 6;

FIG. 18 is a flow chart exemplifying the image capturing processing according to Embodiment 8.

DESCRIPTION OF THE EMBODIMENTS

Embodiment 1

Embodiments of the present invention will be described with reference to the drawings. In Embodiment 1, a live view display screen, on which a live image (moving image of an image capturing target) is displayed, displays previously captured images along with the live image. On the screen of the imaging apparatus, the display position where the live image is displayed and the display positions where the previously captured images are displayed, can be determined based on the operation by the user. The user can capture an image that is consistent with the previously captured images by adjusting the composition, brightness, tinge, and the like of the live image in accordance with the previously captured images. Elements by which the user senses consistency vary. An example is commonality of composition, such as a commonality of the position and size of the subject among the images, or a commonality of the horizon position in the landscape among the images. Another example is a commonality of category of the subject in terms of food, a person, landscape and an animal. Furthermore, the user may sense consistency by a commonality of tinge and gradation of the subject among the images, or a commonality of filters (e.g. saturation emphasis) applied to the images.

The imaging apparatus according to Embodiment 1 is described as a smartphone with camera functions, but is not limited to this. The image apparatus may be a different apparatus having imaging functions, such as a digital camera, a digital video camera, a portable telephone and other portable electronic devices.

Figure 1:
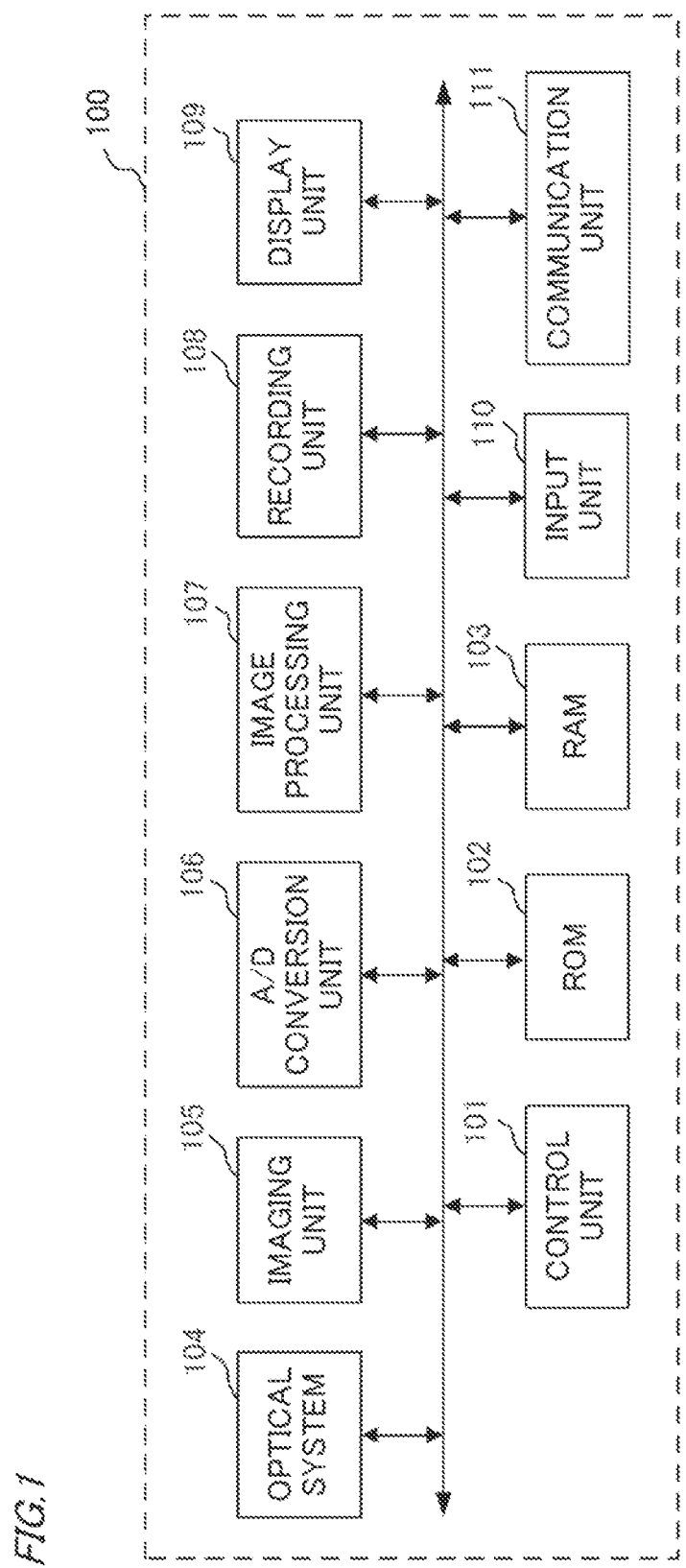
FIG. 1 is a block diagram depicting a configuration example of the imaging apparatus.

Apparatus Configuration: FIG. 1 is a block diagram depicting a configuration example of the imaging apparatus. The configuration example of the imaging apparatus 100 according to Embodiment 1 will be described with reference to FIG. 1.

A control unit 101 is a processor, such as a CPU or a DSP, for example. The control unit 101 reads a control program for each block included in the imaging apparatus 100 from a ROM 102, develops the control program in RAM 103, and executes the program. Thereby the control unit 101 can control the operation of each block included in the imaging apparatus 100.

The ROM 102 is a non-volatile memory which is electrically erasable and recordable. The ROM 102 stores not only the operation program of each block included in the imaging apparatus 100, but also the parameters and the like used for the operation of each block.

The RAM 103 is a rewritable non-volatile memory. The RAM 103 is used for developing a program executed by the control unit 101 or the like, and temporarily storing data generated during the operation of each block included in the imaging apparatus 100.

An optical system 104 is constituted of a lens group, including a zoom lens and a focus lens, and forms an image of a subject on an imaging surface of an imaging unit 105 (image capturing unit). The imaging unit 105 is, for example, an image pickup element, such as a CCD and CMOS sensor. The imaging unit 105 performs photoelectric conversion on an optical image which the optical system 104 formed on the imaging surface of the imaging unit 105, and outputs the acquired analog image signals to an A/D conversion unit 106.

The A/D conversion unit 106 converts inputted analog image signals into digital image data. The digital image data outputted from the A/D conversion unit 106 is temporarily stored in the RAM 103.

An image processing unit 107 develops the digital image data from the image data stored in the RAM 103, and applies various types of image processing to display or record the image data. Examples of the image processing applied to the image data include: defect correction processing for pixels in a case where a defect is caused by the optical system 104 or image pickup element, demosaicing processing, white balance correction processing, color interpolation processing and gamma processing.

A recording unit 108 records data, including image data, to an internal recording medium. A display unit 109 includes a display device, such as a liquid crystal display (LCD), and displays an image stored in the RAM 103 and an image recorded in the recording unit 108 on the display device. The display unit 109 also displays a user interface for operation, which is used for receiving instructions from the user.

An input unit 110 is an input interface which includes various physical operation members, such as a touch panel and a shutter button, and receives an input instruction from the user. A communication unit 111 (transmission unit) wirelessly connects with an external server, so as to transmit/receive image data and data including the later mentioned disposition information. The external server is, for example, a social network service (hereafter referred to as SNS), which performs such services as receiving images captured by a user, and publishing these pictures to viewers of an SNS.

Based on the control of the control unit 101, the imaging apparatus 100 performs live view display that sequentially displays analog image signals (which are sequentially outputted from the imaging unit 105) via the A/D conversion unit 106, the RAM 103, the image processing unit 107 and the display unit 109. During the live view display, the user can adjust the composition for actual image capturing to record image data to the recording medium. The user can also prepare for the actual image capturing during the live view display by changing the image processing conditions so as to change the exposure conditions (e.g. aperture, shutter speed) and image quality (e.g. brightness, gradation, tinge).

Figure 2A:
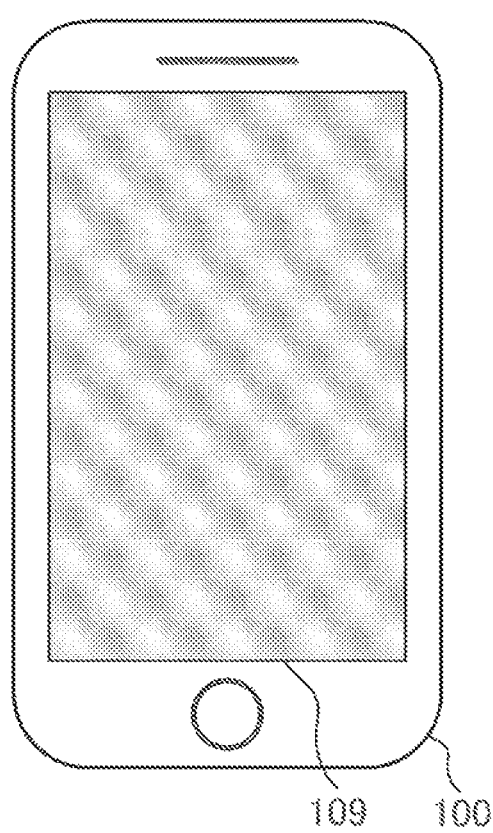
FIGS. 2A and 2B are diagrams exemplifying the appearance of the imaging apparatus.
Figure 2B:
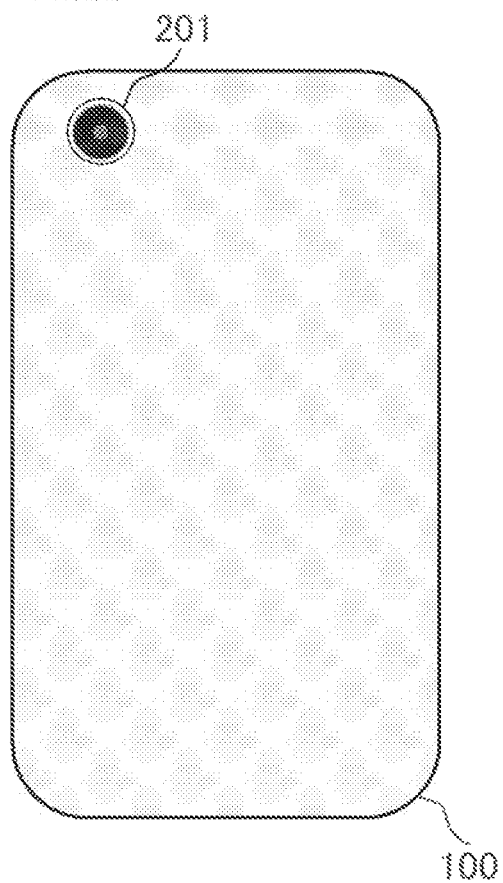

FIGS. 2A and 2B are diagrams exemplifying the appearance of the imaging apparatus. The appearance of a smartphone, which is used as the imaging apparatus 100, will be described with reference to FIGS. 2A and 2B. FIG. 2A is a front view of the imaging apparatus 100 (smartphone), and FIG. 2B is a rear view of the imaging apparatus 100.

The imaging apparatus 100 includes the display unit 109 and a camera unit 201. The camera unit 201 includes the optical system 104, the imaging unit 105 and the A/D conversion unit 106 described in FIG. 1.

Figure 3:
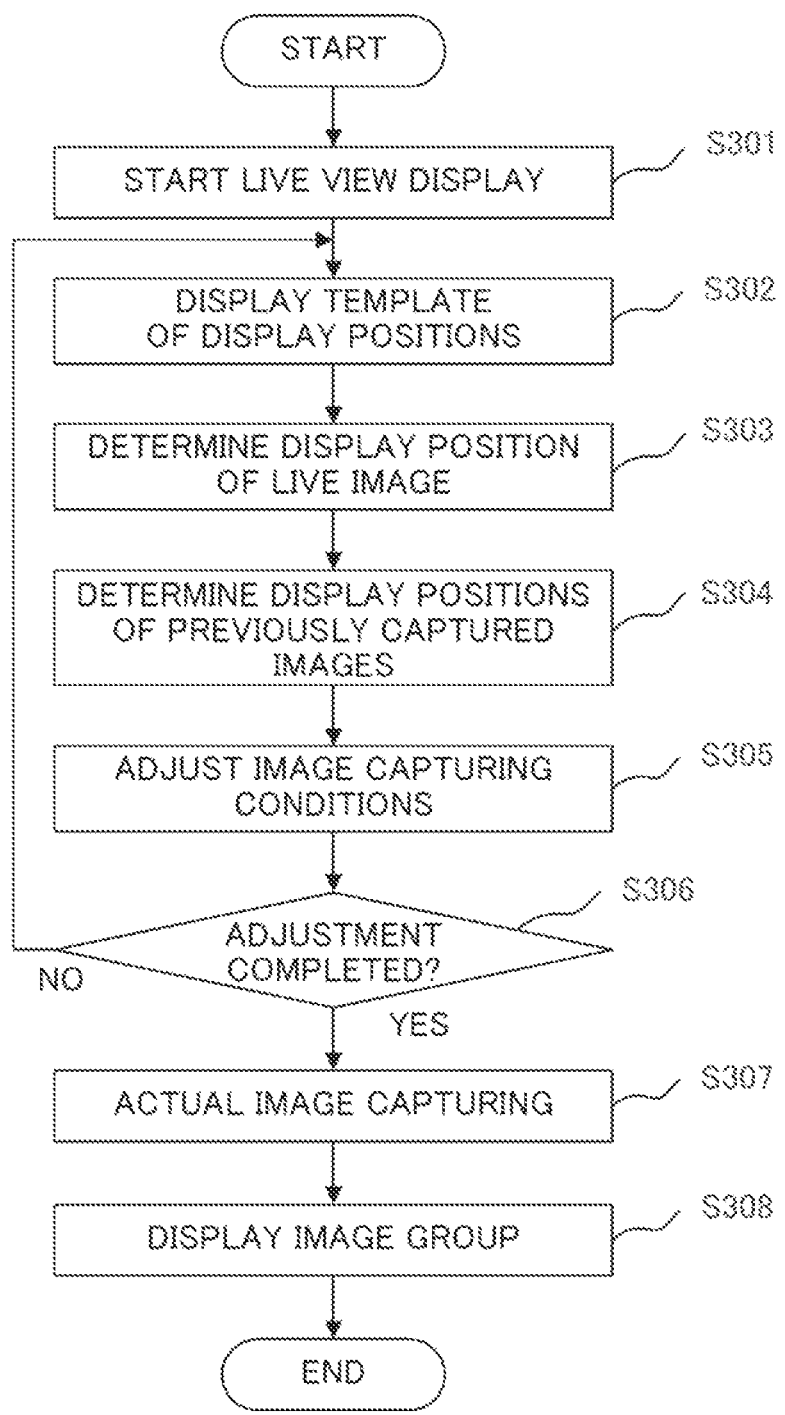
FIG. 3 is a flow chart exemplifying the image capturing processing according to Embodiment 1.

Image Capturing Processing According to Embodiment 1: FIG. 3 is a flow chart exemplifying the image capturing processing according to Embodiment 1. The image capturing processing of the imaging apparatus 100 according to Embodiment 1 will be described in detail with reference to FIG. 3. Each step of the imaging capturing processing is executed by the control unit 101 or by each block of the imaging apparatus 100 which received an instruction from the control unit 101.

A live view display screen and an image group display screen, which are displayed on the display unit 109 in the image capturing processing indicated in FIG. 3, will be described with reference to FIGS. 4A to 4C and FIGS. 5A to 5C. The live view display screens in FIGS. 4A to 4C and FIGS. 5A and 5B are display screens before image capturing, for displaying the live image, disposing preciously captured images and adjusting the live image. The image group display screen in FIG. 5C is a display screen after image capturing, for displaying an image group constituted of the captured image, of the adjusted live image and the disposed previously captured images. FIGS. 4A to 4C are diagrams for describing the disposition of the live image and previously captured images. FIGS. 5A to 5C are diagrams for describing the adjustment of the live image.

The image capturing processing in FIG. 3 starts when the user sets the imaging apparatus 100 to an image capturing mode in which an image can be captured by the camera. For example, the user can select an image capturing mode by starting a camera function application on a smartphone.

In step S301, the control unit 101 starts the live view display by controlling the optical system 104, the imaging unit 105, the A/D conversion unit 106, the RAM 103, the image processing unit 107 and the display unit 109.

During the live view display period, the imaging apparatus 100 sequentially captures and acquires the live image. The acquired live image is displayed on a display device of the display unit 109. While checking the live image that is displayed sequentially, the user can determine the composition or change the exposure conditions, image processing conditions, and the like. The processing steps in S302, S303, S304, S305 and S306 (described later) are processing steps that are executed during the live view display period.

In step S302, the control unit 101 displays a template which indicates the display positions of the images disposed on the display unit 109. The template has a plurality of regions which are divided in advance. The control unit 101 displays either a predetermined template or a template selected by the user.

The template of the display positions of images will be described with reference to FIG. 4A. The template of the display positions includes a plurality of frames (regions) to dispose the images. For example, the user can select a display position of an image by dragging an image, which is selected out of undisposed images displayed on the display unit 109, and dropping the image into a specified region of the template.

FIG. 4A indicates a live view display screen in which the template 401 of the display positions is displayed on the display unit 109. The template 401 includes nine rectangular regions (three rows×three rows) in total. Each rectangular region indicates a position where an image is disposed. One image is disposed in one rectangular region. In other words, nine images can be disposed in the template 401.

The template of the display positions is not limited to the example in FIG. 4A. For example, the template of the display positions may be divided into four regions, where four images can be disposed. Each of the plurality of the divided regions is not limited to a rectangle, but may be various shapes, including a circle and a polygon. The size of each region of the template of the display positions may be different from each other. Further, the display positions of the images may be determined by the user freely disposing each image within a predetermined region without using a template.

In step S303, the control unit 101 (determination unit) determines a display position, where a live image of the target subject of image capturing is displayed, in the template 401 of the display positions displayed on the live view display screen. The control unit 101 may determine a region, which the user selected from the regions included in the template 401, as the display position of the live image.

Determination of the display position of the live image will be described with reference to FIG. 4B. In the state of FIG. 4A where the template 401 of the display positions is being displayed, the user selects a rectangular region to display the live image by the touch operation. The control unit 101 sets the rectangular region selected by the user as the display position of the live image, and displays the live image in this rectangular region. The live view display screen in FIG. 4B indicates an example in a case where the user selected the rectangular region 402, which is at the center of the 9 rectangular regions, as the display position of the live image. The control unit 101 determines the rectangular region 402 as the display position of the live image, and displays the live image of a plate and a slice of bread, on which a fried egg is placed, in the rectangular region 402. The subject is not limited to food, but may be a person, an animal, a building, a landscape, or the like.

Determination of the display position of the live image is not limited to selection by the user. For example, a display position of the live image may be set in advance for each template.

In step S304, based on a user operation, the control unit 101 disposes previously captured images in the template 401 of the display positions. The user operation is, for example, an operation to drag an image selected from the previously captured images that are displayed on the display unit 109 and are not yet disposed, and drop the image in a target position (region) to dispose the image in the template 401. The control unit 101 disposes an image, selected from the previously captured images that are not yet disposed, in a target region by the drag and drop operation.

Selection and disposition of previously captured images will be described with reference to FIG. 4C. The live view display screen in FIG. 4C indicates an example in a case where five previously captured images are disposed around the rectangular region 402 where the live image is displayed as the result of the processing in step S304.

In step S303, in a case where the display position of the live image is determined, the control unit 101 displays an undisposed previously captured image list 403 in a position that is different from the template 401. In the example in FIG. 4C, five previously captured images that are not yet disposed are displayed in the undisposed previously captured image list 403. The images that are displayed in the undisposed previously captured image list 403 are acquired from the recording unit 108. The user selects a desired previously captured image while checking the undisposed previously captured images displayed on the live view display screen, and drags and drops the selected image in the disposition target position in the template 401, whereby the previously captured images can be disposed one by one.

In order to provide a sense of consistency to the images within the image group in the list display, it is assumed that the user selects images of which subject, composition, brightness, tinge, or the like are similar to the live image and the already disposed previously captured images, from the undisposed previously captured image list 403. In the example in FIG. 4C, the images of the chicken and the flower, out of the undisposed previously captured image list 403, are different subjects from the slice of bread of the live image displayed in the rectangular region 402. Therefore, the user does not select the images of the chicken and the flower, but selects an image of the slice of bread, which is the same subject as the live image, from the undisposed previously captured image list 403, and disposes this image. In this way, the control unit 101 disposes a previously captured image in the template 401 based on the operation by the user who disposes a desired image in a desired position.

Disposition of the previously captured images is not limited to the disposition determined based on the user operation. The control unit 101 may analyze each image of the undisposed previously captured image list 403, and dispose an image, of which subject, composition, brightness, tinge, or the like is similar to the live image, in the template 401.

In step S305, the control unit 101 adjusts the image capturing conditions of the live image so that the composition, brightness, tinge or the like of the live image becomes similar to the disposed previously captured images. The image capturing conditions are, for example, conditions related to the image processing operations that are adjustable when the live image is captured (e.g. composition, exposure condition, colors, gradation).

As an example of adjusting the image capturing conditions, a method of adjusting the composition will be described with reference to FIGS. 5A and 5B. FIGS. 5A and 5B indicate an example of the live view display screen after eight previously captured images were disposed in step S304. A zoom bar 501 is a user interface (UI) to change the zoom factor of the live image. An image capturing button 502 is a UI for the image to be actually captured by pressing (touch operation).

In the live view display screen in FIG. 5A, the slice of bread, which is the subject of the live image in the rectangular region 402, is displayed at a size that is smaller than the slices of bread of the previously captured images disposed surrounding the live image. If the image is captured in this state, the subject size is different between the live image and the previously captured images, hence the display of the image group which includes this captured image of the subject and the previously captured images cannot provide a sense of consistency, which is not desirable.

The live view display screen in FIG. 5B indicates an example after the user performed an operation to increase the zoom factor of the live image, so as to provide a sense of consistency to the display of the image group. The user can increase the zoom factor by moving the tab of the zoom bar 501 in the + direction. The subject size increases by the operation of increasing the zoom factor. In FIG. 5A, the subject size of the live image is smaller than the subject size of the previously captured images surrounding the live image, but in FIG. 5B, the subject size of the live image is approximately the same as the subject sizes of the previously captured images surrounding the live image, as a result of increasing the zoom factor. By changing the zoom factor of the live image, the user can make the sizes of the subjects consistent among the live image and the previously captured images, thereby the list of the live image and the previously captured images can be displayed with a sense of consistency.

FIGS. 5A and 5B indicate an example of adjusting the composition, but adjustment of the image capturing conditions is not limited to this. The user may adjust such image capturing conditions as brightness or tinge of the live image on the live view display screen. In other words, the live view display screen may include a UI to adjust the brightness, tinge and the like of the live image. By adjusting either one or a combination of the composition, brightness, tinge and the like, the user can capture an image having a higher sense of consistency with the previously captured images.

The change of the image capturing conditions is not limited to the change by the user, but may be automatically be performed by the imaging apparatus 100, or may be suggested by the imaging apparatus 100. For example, the control unit 101 (change unit) may automatically changes the brightness, tinge or the like of the live image, so as to provide a sense of consistency with the previously captured images. For the composition as well, the control unit 101 can automatically change the zoom factor of the live image, so that the size of the subject of the live image becomes consistent with that of the previously captured images.

In the automatic adjustment of the image capturing conditions, the imaging apparatus 100 adjusts the image capturing conditions so that composition, brightness, tinge and the like become similar between the disposed previously captured images and the live image. The image capturing conditions are image processing conditions to change the composition, exposure conditions, colors, gradation and the like.

As an example of adjusting the image capturing conditions, a method of adjusting the composition will be described with reference to FIGS. 5A and 5B. FIGS. 5A and 5B indicate an example of the live view display screen after eight previously captured images were selected and disposed in step S304. An image capturing button 502 is a UI for receiving an image capturing operation.

In the live view display screen in FIG. 5A, the slice of bread of the live image displayed in the rectangular region 402 is displayed at a size that is smaller than the slices of bread of the previously captured images surrounding the live image. If the image is captured in this state, the subject size is different between the live image in the rectangular region 402 and the previously captured images, and the list display of these images may not provide a sense of consistency.

In order to provide a sense of consistency to the sizes of the subjects, the control unit 101 calculates the subject size (e.g. longitudinal and lateral lengths of the rectangle surrounding the subject) of each of the previously captured images. For example, the control unit 101 may set an average value of the size of each of the previously captured images, as the subject size of the live image, and adjust the subject size of the live image accordingly. In a case where the size of the region where each of the previously captured images is displayed is different from the size of the region where the live image is displayed, the control unit 101 may set the subject size of the live image in accordance with the surface area ratio with respect to the surface area of each region.

The control unit 101 adjusts the focal distance of the optical system 104 so that the subject in the live image is displayed at the size that is set. In the example in FIG. 5A, the subjects of the live image that is displayed in the rectangular region 402 is smaller than the subject of the previously captured images surrounding the live image. Therefore, the control unit 101 changes the focal distance of the lens toward the telephoto side so as to increase the displayed subject size, as illustrated in the live view display screen in FIG. 5B.

If the imaging apparatus 100 includes a plurality of optical systems 104, the optical system 104 that is used may be switched in accordance with the subject size. In a case of the imaging apparatus 100 having a single focus lens (e.g. smartphone), the subject size of the live image can be matched with the subject size of each previously captured image by cropping or magnifying (electronic zoom) the image. Further, the imaging apparatus 100 may match the subject size of the live image with the subject size of each previously captured image by both changing the focal distance of the optical system 104 and using the electronic zoom.

By adjusting the subject size, the subject of the live image, of which size is smaller than the subject sizes of the previously captured images surrounding the live image in FIG. 5A, can be magnified to the size similar to the subject sizes of the previously captured images surrounding the live image in FIG. 5B. By changing the zoom factor automatically, the subject sizes of a plurality of images become similar, hence the list of the plurality of images displayed on the live image screen after image capturing becomes a list having a sense of consistency.

The processing to make the subject sizes of a plurality of images consistent is not limited to adjusting the subject size of the live image based on the previously captured images. The control unit 101 may adjust the subject sizes of the previously captured images based on the live image. For example, in the case where a subject of a previously captured image is smaller than the subject of the live image, the control unit 101 may increase the subject size of the previously captured image by cropping and magnifying the previously captured image.

Besides the subject size, the control unit 101 can also provide a sense of consistency in the degree of blur (depth of field) and the like by the optical system control, image processing or a combination thereof. For example, the list display of portrait images become a more desirable display if the degree of blur is made consistent. The depth of field changes depending on the image capturing conditions, such as focal distance, subject distance and aperture. By automatically determining the image capturing conditions for the live image based on the image capturing conditions of the previously captured images, the control unit 101 can make the depth of field of the live image the same as the previously captured images. By matching the depth of focus of the live image with the previously captured images, the control unit 101 can make the degree of blur consistent in the list display.

In step S306, the control unit 101 determines whether the adjustment of the image capturing conditions in step S305 completed. For example, the control unit 101 may determine whether or not the adjustment of the image capturing conditions completed depending on whether the user completed the adjustment of the image capturing conditions, and pressed the image capturing button 502. Processing advances to step S307 if the adjustment of the image capturing conditions completed (step S306: YES). If the adjustment of the image capturing conditions is not completed (step S306: NO), processing returns to step S302, and the processing steps S302, S303, S304 and S305 are repeated until the adjustment of the image capturing conditions complete. By adjusting the disposition, composition, brightness and tinge of the live image based on the user' instruction like this, the control unit 101 can capture an image having a sense of consistency with the previously captured images.

When the adjustment of the live image completed in step S306, the image capturing button 502 is pressed, and the control unit 101 performs actual image capturing in step S307. The image captured by the actual image capturing step is in the state adjusted in step S305, hence composition, brightness, tinge and the like of this captured image become similar to those previously captured images disposed on the live view display screen.

The control unit 101 corresponds the live image captured by the actual capturing and the previously captured images disposed on the live view display screen as one image group. Further, the control unit 101 corresponds the image data on the captured image of the live image and the previously captured image with the disposition information, including the display position of the live image and each display position of the previously captured images, and records the image data in the recording unit 108 in this state.

In step S307, the actual image capturing is executed by the user pressing the image capturing button 502, but the actual image capturing may be executed automatically. When it is determined that the adjustment of the image capturing conditions (e.g. subject size) of the live image in accordance with the previously captured images completed in step S305, the control unit 101 may automatically execute the actual image capturing.

Furthermore, the control unit 101 may notify the user of the completion of adjustment of the image capturing conditions. For example, the control unit 101 may display a message to notify the completion of adjustment of the image capturing conditions on the display unit 109. Then the user checks the message displayed on the display unit 109, and executes the actual image capturing.

In step S308, the control unit 101 acquires the image data and disposition information of the image group recorded in the recording unit 108, and displays the image data of the image group on the display unit 109 based on the acquired disposition information.

An image group display screen on which image data in the image group is displayed will be described with reference to FIG. 5C. The image group display screen in FIG. 5C indicates an example in a case where the actually captured image of the subject is displayed in a rectangular region 503, and previous captured images corresponded with the captured image are displayed surrounding the captured image. The control unit 101 disposes the image data in the image group on the display screen of the display unit 109 based on the disposition information on the image group. The image capturing processing ends when each image is displayed on the image group display screen.

In Embodiment 1 described above, composition, brightness, tinge and the like of the live image can be adjusted while checking the previously captured images disposed on the live view display screen. Thereby the user can capture a live image that provides a sense of consistency with the previously captured images. Therefore, the user can easily generate an image group having a sense of consistency.

In Embodiment 1, an adjustment to match the composition of the live image with the previously captured images displayed on the live view display screen was described, but the adjustment of the live image is not limited to this. For example, adjustment of the live image includes adjustment of the exposure conditions, or adjustment of the image processing conditions to change such image quality as brightness, gradation and tinge.

Specifically, the adjustment of the exposure conditions may be processing to adjust the brightness of the live image by adjusting the exposure correction amount. Further, the adjustment of the image processing conditions may be processing to adjust saturation of the live image by adjusting the chroma enhancement amount.

The control unit 101 (upload unit) of the imaging apparatus 100 may allow the user to post an image group having a sense of consistency by uploading the image data and disposition information of the generated image group to an external server that provides such service as an SNS.

Embodiment 2

Embodiment 2 is an embodiment in which the previously captured images disposed on the live view display screen are acquired from an external server that provides such a service as an SNS. Configuration of an imaging apparatus according to Embodiment 2 is the same as the imaging apparatus 100 according to Embodiment 1 indicated in FIG. 1, hence description thereof is omitted.

The external server receives the image group of the previously captured images and corresponding disposition information from a plurality of imaging apparatuses 100, and records this in a recording unit of the external server. When the external service is accessed via a Web browser or the like, the external server can display a list of previously captured images included in the image group based on the disposition information.

Image Capturing Processing According to Embodiment 2: FIG. 6 is a flow chart exemplifying the image capturing processing according to Embodiment 2. The image capturing processing of the imaging apparatus 100 according to Embodiment 2 will be described in detail with reference to FIG. 6. Each step of the image capturing processing is executed by the control unit 101, or by each block of the imaging apparatus 100 which received an instruction from the control unit 101. A step that is the same as the image capturing processing according to Embodiment 1 in FIG. 3 is denoted with the same reference sign, and detailed description thereof is omitted.

Figure 7C:
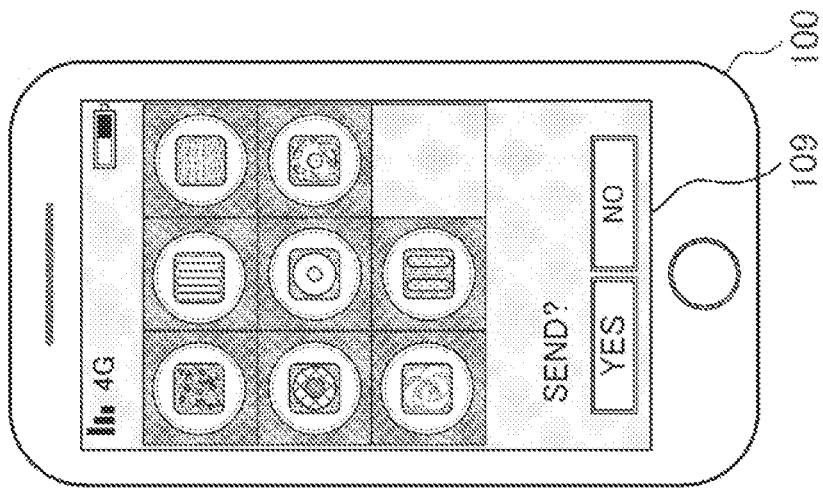
FIGS. 7A to 7C are diagrams for describing the screen examples in the image capturing processing according to Embodiment 2.
Figure 7B:
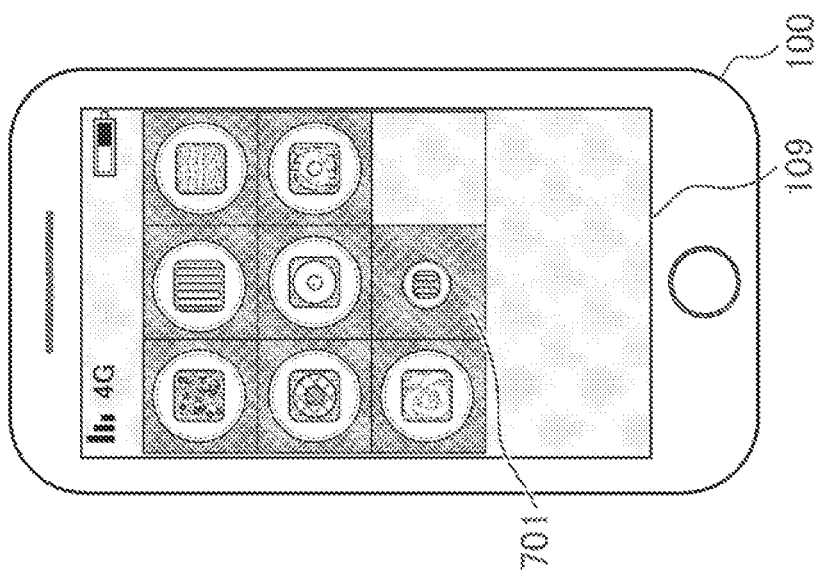
Figure 7A:
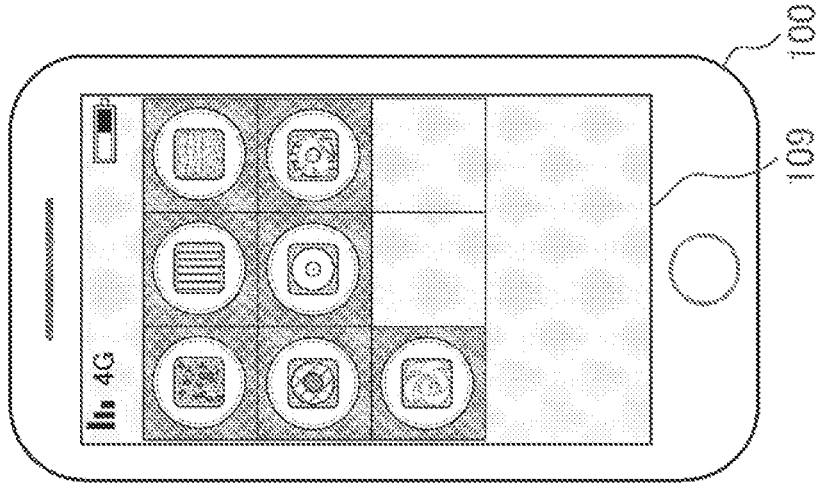

A live view display screen and an image group display screen, which are displayed on the display unit 109 in the image capturing processing indicated in FIG. 6, will be described with reference to FIGS. 7A to 7C. The live view display screens in FIGS. 7A and 7B are screens that display the previously captured images based on the image data and disposition information of an image group acquired from an external server. The image group display screen in FIG. 7C is a screen that displays captured images in the image group, and has an UI to send the captured images of the subject and corresponding disposition information to the external server.

In step S301, the control unit 101 starts the live view display. In step S601, via the communication unit 111, the control unit 101 acquires the captured images in the image group and the corresponding disposition information, which are recorded on the external server.

In step S602, the control unit 101 disposes the captured images (image data in the image group) acquired in step S601 on the live view display screen based on the disposition information.

Disposition of the previously captured images will be described with reference to FIG. 7A. FIG. 7A indicates an example in a case where seven previously captured images acquired from the external server are disposed on the live view display screen based on the corresponding disposition information. The information on the template of the display positions used for disposing the previously captured images is assumed to be included in the disposition information.

FIG. 7A is an example in a case where seven previously captured images are disposed in seven places in the template which includes nine rectangular regions. Out of the nine rectangular regions, no previously captured image is disposed in the lower center and lower right rectangular regions. In this way, the imaging apparatus 100 can acquire the previously captured images in the image group and the disposition information recorded on the external server, and dispose the previously captured images on the live view display screen based on the acquired disposition information. In other words, the imaging apparatus 100 can reproduce the image data in the image group on the live view display screen at the same disposition as the case of accessing and viewing the image data on the external server.

The display position of a previously captured image on the live view display screen may be changeable by the user. The user may change a position of a previously captured image by dragging and dropping the target previously captured image into a desired position. If a previously captured image is already disposed in the target position, this image and the image of which position is changed to this position, may be mutually replaced.

In step S603, the control unit 101 determines the display position of the live image. For example, as the display position of the live image, the control unit 101 may determine a region that the user selected from the rectangular regions where a previously captured image is not disposed in the template.

Determination of the display position of the live image will be described with reference to FIG. 7B. In the example in FIG. 7A, as the display position of the live image, the user selects by touch operation a rectangular region at the lower center or the lower right where a previously captured image is disposed, out of the nine rectangular regions. FIG. 7B indicates an example in a case where the user selected a rectangular region 701 at the lower center. The control unit 101 displays a live image in the rectangular region 701 selected by the user.

In steps S305 and S306, the control unit 101 changes the image capturing conditions of the live image based on the user instruction, just like Embodiment 1, and determines whether the adjustment of the image capturing conditions completed. If the adjustment of the image capturing conditions is not completed (step S306: NO), processing returns to step S601, and processing steps S601, S602, S603 and S305 are repeated until the adjustment of the image capturing conditions completes.

In steps S307 and S308, the control unit 101 executes the actual image capturing just like Embodiment 1, and corresponds the captured image of the live image and the previously captured images disposed in the template as an image group, and displays the image group on the image group display screen.

In step S604, the control unit 101 determines whether or not to send the image data in the image group and the corresponding disposition information to the external server based on the user instruction.

Receiving of an instruction to send the image data and the disposition information of the image group will be described with reference to FIG. 7C. FIG. 7C is an example of a screen where a UI, to receive an instruction whether or not the image data and the disposition information of the image group are sent to an external server, is added to the image group display screen to display the image group in step S308 in FIG. 6. The user can check the sense of consistency in the image group in terms of composition, brightness, tinge, and the like, and determine whether the image data and the disposition information of the image group will be sent to the external server.

In the case where the image data and the disposition information of the image group are sent to the external server, the user presses (touches) the "YES' button. If the "YES" button is pressed (touched), the control unit 101 determines that the image data in the image group and the corresponding disposition information are sent to the external server (step S604: YES), and processing advances to step S605.

In the case where the image data and the disposition information of the image group are not sent to the external server, the user presses (touches) the "NO" button. If the "NO" button is pressed (touched), the control unit 101 determines that the image data in the image group and the corresponding disposition information are not sent to the external server (step S604: NO), and the image capturing processing in FIG. 6 ends.

In step S605, the control unit 101 sends the image data in the image group and the corresponding disposition information to the external server via the communication unit 111, and the image capturing processing in FIG. 6 ends.

In Embodiment 2 described above, the external server can generate the screen to display the image data in the image group in the disposition at the image capturing, based on the image data in the image group and the corresponding disposition information received from the imaging apparatus 100. Thereby when the external server is accessed via a Web browser or the like and the image is viewed, the image group can be viewed in the disposition that is the same as when the images were captured by the imaging apparatus 100.

Embodiment 3

On the live view display screen, a previously captured image to be compared with the live image is selected from an undisposed previously captured image list 403 by user operation. In Embodiment 3, in order to simplify the procedure for the user to select and dispose an image having the same feature [as the live image] out of the previously captured images, related previously captured images, which are acquired based on the feature of a representative image selected by the user, are displayed as selection candidates in the undisposed previously captured image list 403. The representative image is an image that is set as a representative image of previously captured images having a same tag. The previously captured images are classified by a tag that is attached based on the feature of the image.

When the user selects a representative image, candidates of the comparison target previously captured image are narrowed down based on the feature of the representative image. Therefore, the user can reduce the procedures to select the comparison target previously captured images. The configuration of the imaging apparatus according to Embodiment 3 is the same as that of the imaging apparatus 100 according to Embodiment 1 indicated in FIG. 1. Processing steps that are different from Embodiment 1 will now be described.

Tag Attachment Processing: The control unit 101 attaches tags to the previously captured images in advance, and determines a representative image for each tag. First the tag attachment processing to attach tags to the previously captured images will be described.

In a case where a new previously captured image is added to the recording unit 108, the control unit 101 attaches a tag to this image that is added. The control unit 101 extracts the image feature from the captured image that is added to the recording unit 108. The image feature is a composition, tinge, subject and the like of the image, for example.

In the feature extraction based on the composition, the control unit 101 extracts a contour of the subject from the extraction target previously captured image. Based on the extracted contour, the control unit 101 determines which composition, out of the predetermined classification of compositions, this image is classified. The predetermined classification of compositions includes centered composition, rule of thirds and diagonal composition, for example.

The control unit 101 can extract the feature of the composition by determining the pattern of the composition based on the contour of the subject. However, the control unit 101 may extract the feature of the composition by any method as long as the feature of the composition can be extracted thereby. For example, the control unit 101 may extract the feature of the composition based on the position, size, or the like of the subject. Further, the control unit 101 may clip out the surrounding of the subject, and determine the composition thereby.

In the feature extraction based on the tinge, the control unit 101 extracts a representative color from the extraction target previously captured image. The representative color is a pixel value that most frequently appears in the target previously captured image. The control unit 101 may extract a plurality of representative colors, including a pixel value that appears second most frequently and a pixel value that appears third most frequently. Thereby the control unit 101 can extract the feature of the tinge.

The control unit 101 may extract the feature of the tinge by any method as long as the feature of the tinge can be extracted thereby. For example, the control unit 101 may extract the feature of the tinge by weighting the pixel values in accordance with the appearance frequency of a plurality of representative colors.

In the feature extraction based on the subject, for an extraction target previously captured image, the control unit 101 determines which subject, out of the predetermined classification of subjects, this subject of this image is classified. The predetermined classification of subject includes face, animal, cooking, and landscape, for example.

The control unit 101 can extract the feature of the subject by using an image recognition technique. However, the control unit 101 may extract the feature of the subject by any method, as long as the feature of the subject can be extracted thereby. For example, the control unit 101 may extract the feature of the subject based on the shape, tinge, or the like of the subject.

The control unit 101 attaches the feature information of the image, extracted from the previously captured image, to the previously captured image as a tag. The tag is attached by adding the feature of the target image to the target image data as meta data.

FIG. 8 is a diagram exemplifying a tag (meta data) that indicates the feature information of the image. The meta data is data added to the previously captured image data. In the example in FIG. 8, the tag of the composition of the target image is "centered composition", the tag of the tinge is "#E3E9DF, #DA4011", and the tag of the subject is "cooking".

Representative Image Setting Processing: The control unit 101 sets a representative image for the previously captured images to which the tag is attached. The representative image setting processing will now be described.

The control unit 101 sets a representative image for an image group having a same tag value as the previous captured image that was newly added to the recording unit 108, for example. The representative image may be set for an image group of which images have one same tag value, or may be set for an image group of which images have a plurality of same tag values. The tag values need not be exactly the same, and, for example, an image group having a feature of tinge which indicates a color code of similar colors may be regarded as an image group having a same tag value.

The representative image may be selected by any method as long as one image to be a representative of an image group having a same tag value can be selected. For example, the control unit 101 may select a representative image based on the image capturing date and time of each image included in the image group having a same tag value. Specifically, for a representative image, the control unit 101 may select an image of which image capturing date and time is the newest among the images included in the image group having a same tag value.

The control unit 101 may set a representative image based on a combination of a plurality of tags. For example, for the previously captured images having the tag information indicated in FIG. 8, a representative image is set for an image group of which composition is "centered composition" and subject is "cooking". By combining a plurality of tags, the control unit 101 can set a representative image for an image group with more restricted conditions.

Information related to the representative image is added to the image data as meta data, just like information on the tag. The information related to the representative image includes the type of tag shared in the image group to which this representative image belongs, and the value of this tag.

A representative image may be set at a timing when a previously captured image is newly added to the recording unit 108, or may be set at a timing when a predetermined number of images are added to the recording unit 108. In a case where a representative image has already been set for an image group having a same tag value, it may be programmed so that the control unit 101 does not execute the representative image setting processing.

Figure 9:
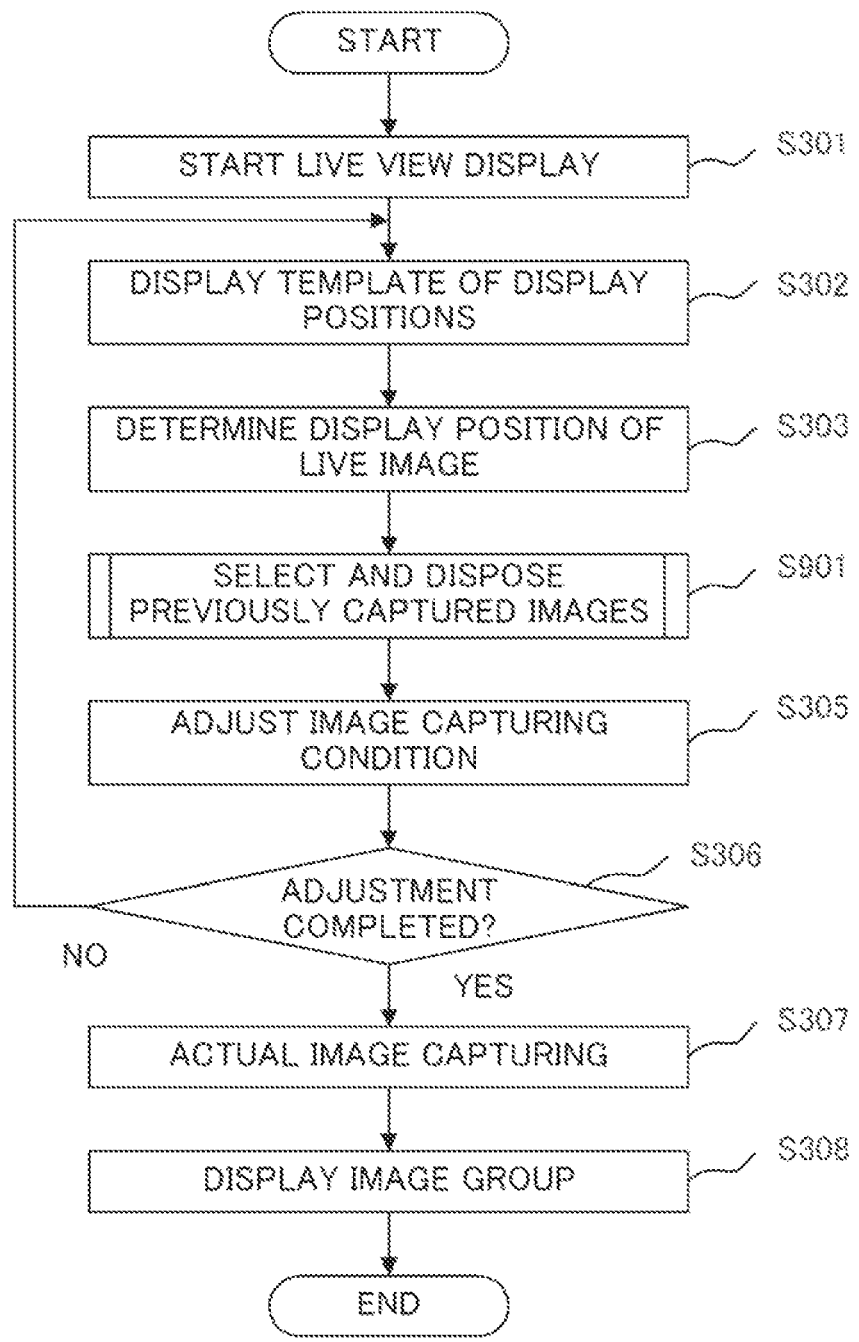
FIG. 9 is a flow chart exemplifying the image capturing processing according to Embodiment 3.
Figure 10:
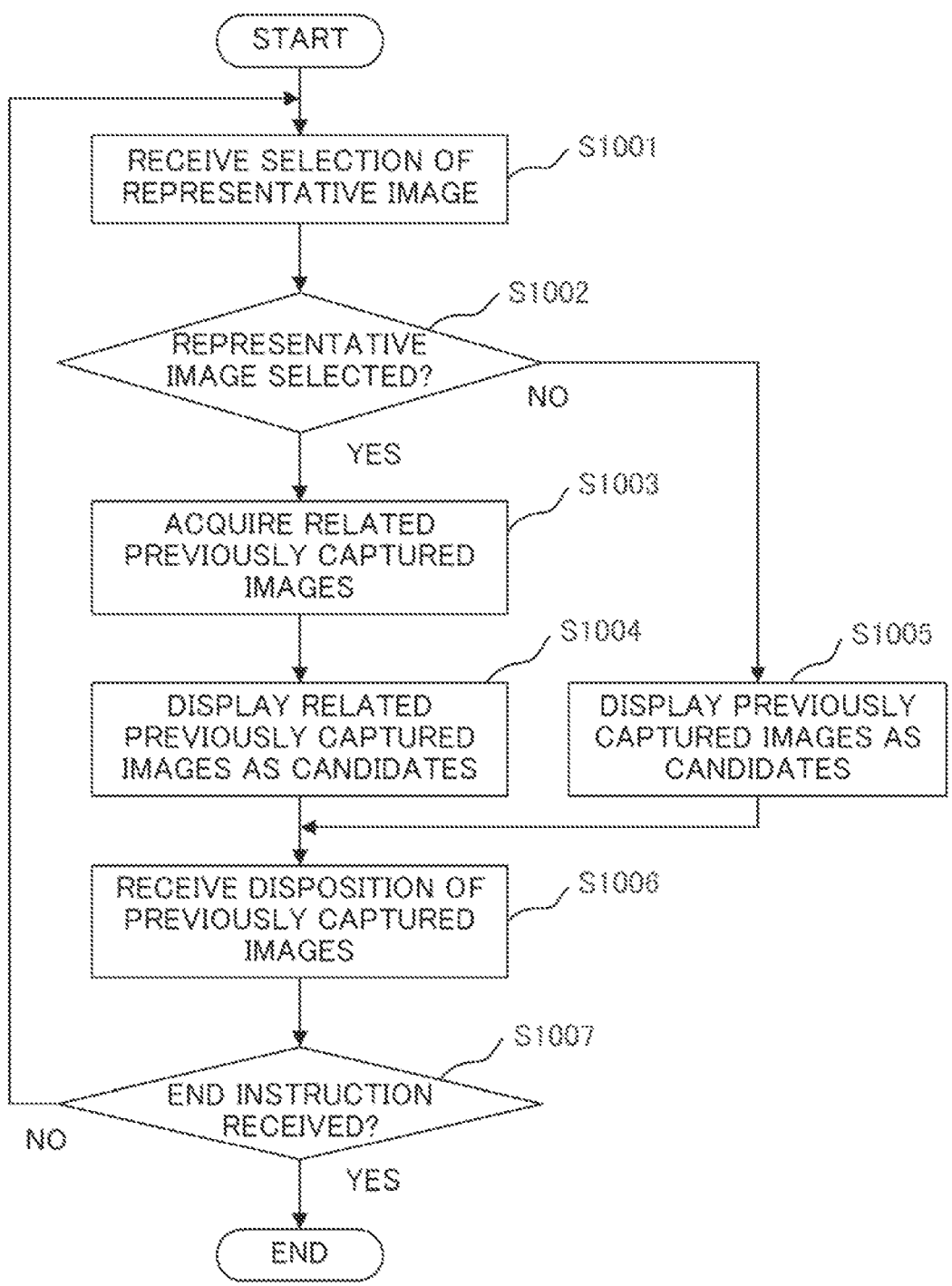
FIG. 10 is a flow chart exemplifying the previously captured image disposition processing according to Embodiment 3.

Image Capturing Processing According to Embodiment 3: FIG. 9 is a flow chart exemplifying the image capturing processing according to Embodiment 3. FIG. 10 is a flow chart exemplifying the previously captured image disposition processing according to Embodiment 3. The previously captured image disposition processing is a sub-flow of the image capturing processing. The image capturing processing of the imaging apparatus 100 according to Embodiment 3 will be described with reference to FIGS. 9 and 10. The image capturing processing in FIG. 9 is the same as the image capturing processing in FIG. 3, except for the processing in step S901. A processing step that is the same as in FIG. 3 is denoted with the same reference sign, and description thereof is omitted. In the previously captured image disposition processing in FIG. 10, detailed processing in step S901 is exemplified.

Figure 11A:
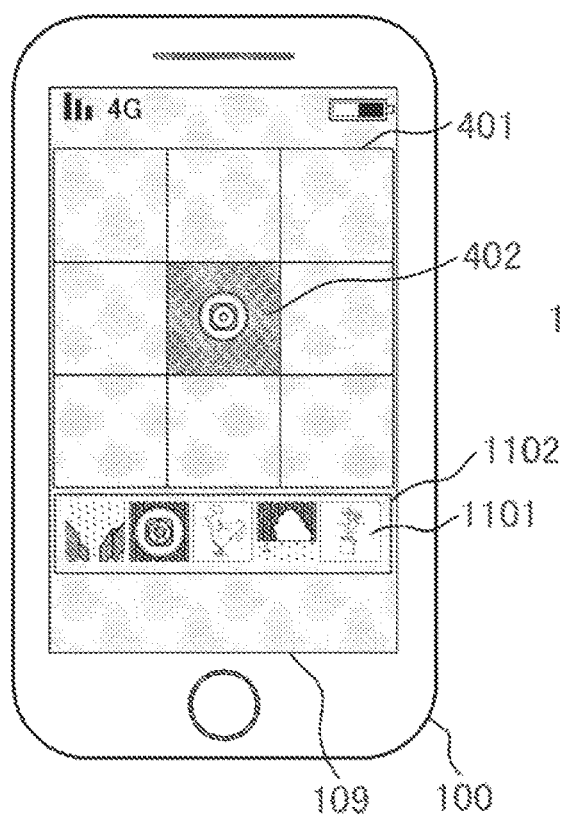
FIGS. 11A and 11B are diagrams exemplifying the UI according to Embodiment 3.

In step S1001, the control unit 101 receives an operation to select a representative image from the user. A UI to receive the selection of the representative image from the user will be described with reference to FIGS. 11A and 11B. FIG. 11A indicates a state where a plurality of representative images (selection candidates) are displayed in a display region 1102 of the display unit 109. In the case of FIG. 11A, five representative images 1101 are displayed in the display region 1102.

The control unit 101 receives the selection of a representative image by the operation that the user performs in the display region 1102. For example, the user can select a representative image by touching or dragging and dropping a desired representative image. The control unit 101 disposes the selected representative image in one of the rectangular regions of the template 401 of the display positions. The position to dispose the selected representative image may be a position specified by the user, and may be a rectangular region to which the user moved the representative image by the drag and drop operation.

In a case where a desired representative image is not displayed in the display region 1102, the user can change the candidates of the representative images displayed in the display region 1102. For example, the control unit 101 receives an instruction to display other representative images by the slide operation which the user performed in the display region 1102. When the instruction is received from the user, the control unit 101 changes the representative images displayed in the display region 1102 to other representative images. Thereby even if a desired representative image is not currently displayed, the user can change the display of the display region 1102 and display a desired representative image.

The control unit 101 may change the display in the display region 1102 by receiving an operation to specify a type of tag (composition, tinge, subject) of the image to which the user assigns priority. In this case, the control unit 101 displays a UI that receives specification of the type of the tag on the display unit 109. By the user specifying the type of the tag, the control unit 101 can display the representative images having the specified type of the tag in the display region 1102. Thereby in step S1004, the control unit 101 can present the user with the previously captured images having the tag (feature of the image) to which the user assigns priority.

In step S1002, the control unit 101 determines whether the user selected a representative image. Processing advances to step S1003 if a representative image was selected (step S1002: YES). Processing advances to step S1005 if a representative image was not selected (step S1002: NO). A case where a representative image was not selected is a case where the user did not perform an operation to select a representative image for a predetermined time, for example.

Once a representative image is selected, the selected representative image is disposed in a rectangular region 1105, for example, as indicated in FIG. 1I B. If the user moved the representative image to any one of the rectangular regions of the template 401 by the drag and drop operation, the control unit 101 disposes the selected representative image in the rectangular region specified by the user.

In step S1003, the control unit 101 acquires related previously captured images from the recording unit 108 based on the representative image selected by the user. The related previously captured images are images related to the representative image selected by the user, and are images presented to the user as candidates of the previously captured images to be disposed in the template 401. The related previously captured images can be previously captured images of which tag values are the same as the representative image.

When the related previously captured images are acquired, the control unit 101 may receive an operation to specify a type of a tag (composition, tinge, subject) of the image to which the user assigns priority. In this case, the control unit 101 displays a UI to receive the specification of the type of the tag on the display unit 109. The control unit 101 acquires, with priority, the related previously captured images having the same value of the tag as the specification. In a case where the user selected a plurality of tags, the control unit 101 acquires the related previously captured images having the same values of the plurality of selected tags. Thereby the control unit 101 can acquire, with priority, the related previously captured images in accordance with the type of the tags to which the user assigns priority, from the recording unit 108.

In step S1004, the control unit 101 displays the related previously captured images, acquired in step S1003, on the display unit 109 as the candidates of the previously captured images disposed in the template 401.

Figure 11B:
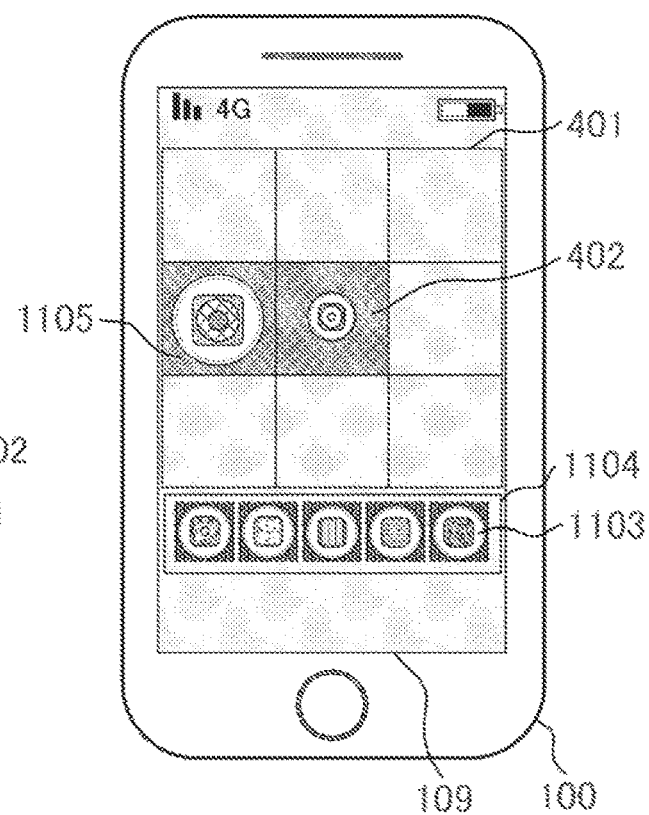

FIG. 11B indicates a display example of the display unit 109 after the state in FIG. 11A is changed in the processing steps S1002 to S1004. In the case of FIG. 11B, the representative image selected in step S1002 is disposed in a center left region, which is one of the rectangles of the template 401, via the drag and drop operation by the user.

The control unit 101 displays the related previously captured images 1103 acquired in step S1003 in the display region 1104, as candidates of the previously captured images to be disposed in the template 401. In the case of FIG. 11B, the control unit 101 displays the five related previously captured images 1103 as candidates. Here the control unit 101 removes the related previously captured image already disposed in the rectangular regions of the template 401 from the candidates displayed in the display region 1104, and displays other related previously captured images which are not yet disposed in the display region 1104.

In a case where a desired related previously captured image is not displayed in the display region 1104, the user can change the related previously captured images displayed in the display region 1104. For example, the control unit 101 receives an instruction to display other related previously captured images by the slide operation which the user performed in the display region 1104. When the instruction is received from the user, the control unit 101 changes the related previously captured images displayed in the display region 1104 to other related previously captured images. Thereby even if a desired related previously captured image is not currently displayed, the user can change the display in the display region 1104, whereby a desired related previously captured image can be displayed.

In a case where a number of related previously captured images acquired in step S1003 is less than a number of images that can be displayed in the display region 1104, the control unit 101 may additionally display other previously captured images. The other previously captured images to be added are, for example, a previously captured image having a same value as any of the tags attached to the representative image, or a previously captured image of which image capturing date and time or image capturing location is close to the representative image. Thereby even if a number of related previously captured images is less than a number of images that can be displayed in the display region 1104, the user can easily select other previously captured images. After the processing in step S1004 ends, processing advances to step S1006.

In step S1005, the control unit 101 displays the previously captured images as candidates of the previously captured images to be disposed in the template 401, since the user has not selected a representative image. The candidates of the previously captured images in step S1005 may be displayed in any preferential order. For example, the control unit 101 may display the previously captured images in the order of image capturing date and time. The control unit 101 removes the previously captured images that are already disposed in the rectangular regions of the template 401 from the candidate display, and displays undisposed previously captured images in the display region 1104.

In step S1006, the control unit 101 receives an instruction from the user to dispose the (related) previously captured image displayed in the display region 1104 in step S1004 and step S1005, in the template 401. The processing to dispose the selected (related) previously captured images in the template 401 is the same as step S304 of Embodiment 1.

Each time one (related) previously captured image is displayed in the template 401, the control unit 101 removes a (related) previously captured image disposed in the template 401 from the candidate display in the display region 1104. When one (related) previously captured image is disposed in the template 401, the control unit 101 displays an additional (related) previously captured image in the display region 1104.

In step S1007, the control unit 101 determines whether or not an instruction to end disposition of the previously captured images was received from the user. If the end instruction was received (step S1007: YES), the previously captured image disposition processing in FIG. 10 ends, and processing advances to step S305 in FIG. 9. Processing returns to step S1001 if the end instruction was not received (step S1007: NO).

In a case where a representative image has already been selected and disposed in the template 401, the control unit 101 may return not to step S1001 but to step S1003, and continue the processing.

In Embodiment 3, the control unit 101 displays the candidates of the previously captured images to be disposed in the template 401 based on the representative image selected by the user. Thereby, the imaging apparatus 100 can reduce the steps that the user must take to select the previously captured images to be compared with the live image.

In step S1006, for the candidates to be displayed in the display region 1104, the control unit 101 may change whether the related previously captured images of the representative image are displayed or the previously captured image under a different condition are displayed in accordance with the instruction from the user. The previously captured images under a different condition are, for example, previously captured images which were captured during a certain image capturing period, previously captured images which were captured at a predetermined image capturing location, or all the previously captured images. Thereby even if a previously captured image desired by the user is not displayed as a candidate, the control unit 101 can present previously captured images under a different condition to the user.

Further, when the related previously captured images selected by the user are disposed in the template 401 in step S1006, the control unit 101 may update the candidates of the related previously captured images to be displayed in the display region 1104. For example, the control unit 101 determines a tag having common values by the tag of the representative image selected by the user in step S1002 and the tag of the related previously captured images selected by the user in step S1006. The control unit 101 displays the previously captured images having the same value as the common tags in the display area 1104 with priority as the new related previously captured image. Since the candidates to be displayed in the display area 1104 are updated based on the related previously captured images selected by the user, the control unit 101 can more easily display the related previously captured images desired by the user as the candidates.

The related previously captured images are not limited to the previously captured images of which tags have a same value, but may be captured images of which tags have values which are in a similarity range. The similarity range of the values of the tags may be predetermined. For example, in the tags of composition, the rule of thirds (vertical) and rule of symmetry (vertical) may be defined as the similarity range. In the tags of tinge, the color codes of similar colors may be defined as the similarity range.

Embodiment 4

In Embodiment 3, in order to reduce the steps that the user must take to select the previously captured images to be compared with the live image, the related previously captured images, which are related to the representative image selected by the user, are displayed on the display unit 109 as the candidates of the previously captured images. In Embodiment 4, on the other hand, the candidates of the preciously captured images are acquired from the recording unit 108 based on the acquisition conditions that the user selected (specified) to acquire the previously captured images, and are displayed on the display unit 109 as the candidates.

In Embodiment 4, the user specifies the acquisition conditions to acquire the candidates of the previously captured images, whereby the candidates of the previously captured images are narrowed down based on the feature (tag) of the image related to the acquisition conditions. Since the candidates in accordance with the specified acquisition conditions are displayed, the user can reduce the steps that must be taken to select the previously captured images. The configuration of the imaging apparatus according to Embodiment 4 is the same as the imaging apparatus 100 according to Embodiment 1 indicated in FIG. 1. In Embodiment 4, the tag attachment processing is executed in the same manner as Embodiment 3. Description on the same processing steps as Embodiment 3 is omitted.

Image Capturing Processing According to Embodiment 4: The image capturing processing of the imaging apparatus 100 according to Embodiment 4 will be described with reference to FIGS. 9 and 12. The image capturing processing of the imaging apparatus 100 according to Embodiment 4 is the same as the image capturing processing according to Embodiment 3, except for the processing in step S901 in FIG. 9.

Figure 12:
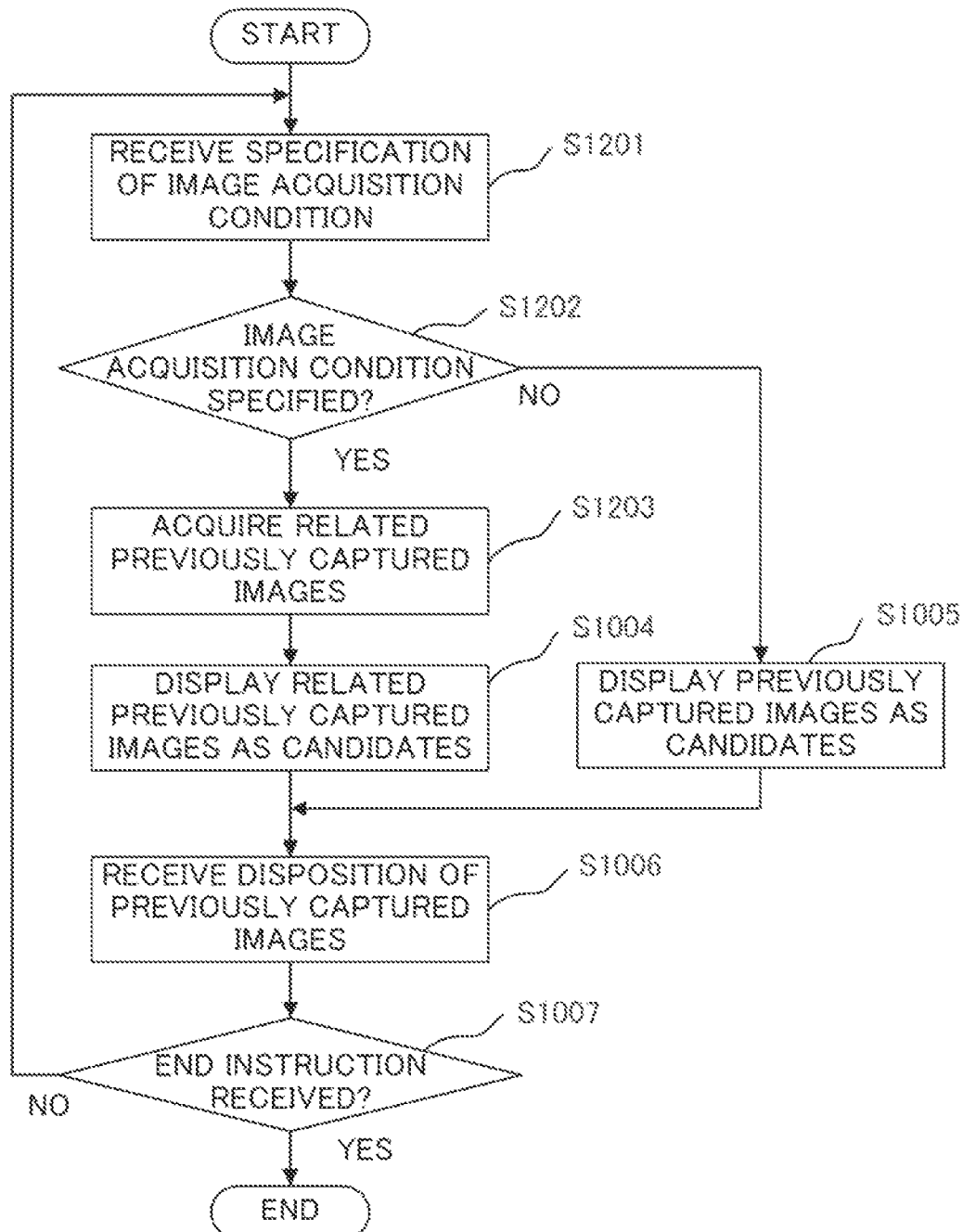
FIG. 12 is a flow chart exemplifying the previously captured image disposition processing according to Embodiment 4.

FIG. 12 is a flow chart exemplifying the previously captured image disposition processing according to Embodiment 4. The previously captured image disposition processing is a sub-flow of the image capturing processing. The previously captured image disposition processing in FIG. 12 exemplifies the detailed processing of step S901. In each step of FIG. 12, a processing step the same as FIG. 10 is denoted with the same reference sign, and description thereof is omitted.

In step S1201, the control unit 101 receives an operation to specify the acquisition condition to acquire the previously captured images from the user. The acquisition conditions to acquire the previously captured images are, for example, a condition of the composition of the image, a condition of the tinge of the image, a condition of the subject of the image, and the like.

A UI which is displayed on the display unit 109 to receive the specification of the acquisition conditions to acquire the previously captured images from the user will be described with reference to FIGS. 13A to 13D. FIG. 13A indicates a UI for the user to specify each item of the acquisition conditions to acquire the previously captured images. A select box 1301 is a UI to specify a condition of the composition. Responding to a tap operation on the select box 1301 performed by the user, the control unit 101 displays the selection items for the condition of the composition indicated in FIG. 13B. The control unit 101 receives the selection of the condition of the composition according to the tap operation by the user.

A select box 1302 is a UI to specify a condition of the tinge. Responding to a tap operation performed by the user, the control unit 101 displays the selection items for the condition of the tinge indicated in FIG. 13C. The control unit 101 receives the selection of the condition of the tinge according to the tap operation by the user.

A select box 1303 is a UI to specify the condition of the subject. Responding to a tap operation performed by the user, the control unit 101 displays the selection items for the condition of the subject indicated in FIG. 13D. The control unit 101 receives the selection of the condition of the subject according to the tap operation by the user.

In this way, the control unit 101 can receive an instruction from the user to specify the acquisition conditions to acquire the previously captured images. The acquisition conditions to acquire the previously captured images, the UI to specify the acquisition conditions, and the operation method by the user are not limited to the abovementioned examples. The instruction of the acquisition conditions to acquire the previously captured images may be received by the user using any method.

For example, the condition of the composition may be selected not from the names of compositions as in FIG. 13B, but from illustrations indicating each composition. The condition of the tinge may be selected not by specify RGB as in FIG. 13C, but from color samples. Further, the condition of the subject may be selected not from the names of the subject as in FIG. 13D, but from illustrations indicating each subject.

In step S1202, the control unit 101 determines whether the user specified the acquisition conditions to acquire the previously captured images. Processing advances to step S1203 if the acquisition conditions to acquire the previously captured images are specified (step S1202: YES). Processing advances to step S1005 if the acquisition conditions to acquire the previously captured images are not specified (step S1202: NO). The case where the acquisition conditions to acquire the previously captured images are not specified is, for example, a case where the user did not perform the operation to specify the acquisition conditions to acquire the previously captured images for a predetermined time.

In step S1203, the control unit 101 acquires the related previously captured images from the recording unit 108 based on the acquisition conditions specified by the user to acquire the previously captured images. For the related previously captured images, the control unit 101 acquires the previously captured images having a tag of which value is the same as the acquisition condition specified by the user to acquire the previously captured images. The processing steps from step S1004 to step S1007 are the same as FIG. 10.

In Embodiment 4, the control unit 101 displays the candidates of the previously captured images to be disposed in the template 401 based on the acquisition conditions specified by the user to acquire the previously captured images. Thereby, the imaging apparatus 100 can reduce the steps that the user must take to select the previously captured images to be compared with the live image.

Embodiment 5

In Embodiment 3 and Embodiment 4, the representative images selected by the user or the related previously captured images related to the acquisition conditions specified by the user to acquire the previously captured images are displayed on the display unit 109 respectively as the candidates of the previously captured images. In Embodiment 5, on the other hand, the candidates of the previously captured images are acquired from the recording unit 108 based on the feature of the live image, and displayed on the display unit 109, in order to reduce the steps that the user must take to select the previously captured images to be compared with the live image.

Since the candidates of the previously captured images are narrowed down based on the feature of the live image, the user can reduce the steps that must be taken to select the previously captured images similar to the live image. The configuration of the imaging apparatus according to Embodiment 5 is the same as the imaging apparatus 100 according to Embodiment 1 indicated in FIG. 1. In Embodiment 5, the tag attachment processing is executed in the same manner as Embodiment 3. Description on the same processing steps as Embodiment 3 is omitted.

Figure 14:
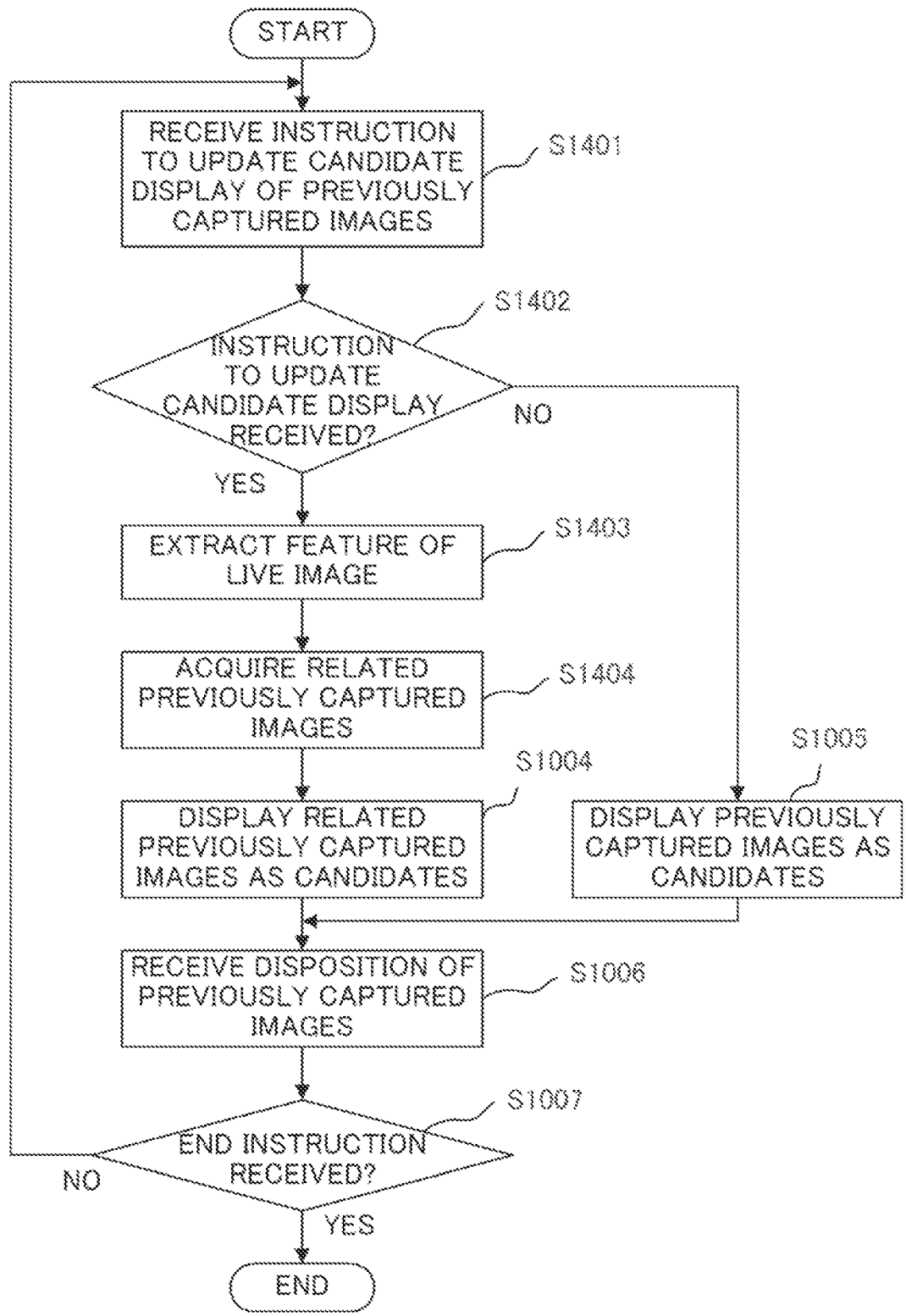
FIG. 14 is a flow chart exemplifying the previously captured image disposition processing according to Embodiment 5.

Image Capturing Processing According to Embodiment 5: The image capturing processing of the imaging apparatus 100 according to Embodiment 5 will be described with reference to FIGS. 9 and 14. The image capturing processing of the imaging apparatus 100 according to Embodiment 5 is the same as the image capturing processing according to Embodiment 3, except for the processing in step S901 in FIG. 9. FIG. 14 is a flow chart exemplifying the previously captured image disposition processing according to Embodiment 5. The previously captured image disposition processing is a sub-flow of the image capturing processing. The previously captured image disposition processing in FIG. 14 exemplifies the detailed processing of step S901.

In step S1401, the control unit 101 receives an instruction from the user to update the display of the candidates of the previously captured images. For example, the display unit 109 displays a UI, such as update buttons, to receive an instruction from the user to update the display of the candidates of the previously captured images. The control unit 101 receives the instruction to update the display of the candidates of the previously captured images by an operation for the user to tap the update button.

In step S1402, the control unit 101 determines whether an instruction from the user to update the display of the candidates of the previously captured images was received. Processing advances to step S1403 if the instruction from the user to update the display was received (step S1402: YES). Processing advances to step S1005 if the instruction from the user to update the display was not received (step S1402: NO).

In step S1403, the control unit 101 extracts the feature of the live image. The method of extracting the feature may be the same as the method of extracting the feature in the tag attachment processing described in Embodiment 3. The control unit 101 may acquire the information on the feature (e.g. composition, tinge, subject) of the live image using the same method as the method of extracting the feature in the tag attachment processing.

While the live image changes as time elapses, the control unit 101 may analyze the feature of the image using the live image at the timing when the instruction from the user to update the display of the candidates of the previously captured images is received in step S1402.

In step S1404, the control unit 101 acquires the related previously captured images from the recording unit 108 based on the feature of the live image. For the related previously captured images, the control unit 101 acquires the previously captured images having a tag of which value is the same as the feature of the live image extracted in step S1403.

In Embodiment 5, the control unit 101 displays the candidates of the previously captured images to be disposed in the template 401 based on the live image. Thereby the imaging apparatus 100 can reduce the steps that the user must take to select the previously captured images to be compared with the live image.

In the description on FIG. 14, the control unit 101 uses the live image at the timing when the user instructed to update the candidates display of the previously captured images, to extract the feature of the live image, but the present invention is not limited to this. The control unit 101 may use a live image at a timing satisfying a predetermined condition, to extract the feature of the live image. The timing satisfying a predetermined condition is, for example, a timing at which the change amount of the live image, due to the elapse of time, is a threshold or less. Thereby the imaging apparatus 100 can reduce the steps that the user must take to instruct the update of the candidate display of the previously captured images. Further, the feature of the live image can be more easily extracted at the timing when the user determined the composition of the image to be captured.

Embodiment 6

In Embodiment 3, the related preciously captured images, which are related to the representative image selected by the user, are displayed on the display unit 109 as the candidates of the previously captured images. In Embodiment 6, on the other hand, the related previously captured images, which are related to the representative image selected by the user, are automatically disposed in the regions of the template 401, in order to further reduce the steps that the user must take to dispose the previously captured images.

In Embodiment 6, the related previously captured images are automatically disposed in the regions of the template 401, hence the user can reduce the steps that must be taken to select and dispose the previously captured images. The configuration of the imaging apparatus according to Embodiment 6 is the same as the imaging apparatus 100 according to Embodiment 1 indicated in FIG. 1. In Embodiment 6, the tag attachment processing and the representative image setting processing are executed in the same manner as Embodiment 3. Description on the same processing steps as Embodiment 3 is omitted.

Image Capturing Processing According to Embodiment 6:
The image capturing processing of the imaging apparatus 100 according to Embodiment 6 will be described with reference to FIGS. 9 and 15. The image capturing processing of the imaging apparatus 100 according to Embodiment 6 is the same as the image capturing processing according to Embodiment 3, except for the processing in step S901 in FIG. 9. FIG. 15 is a flow chart exemplifying the previously captured image disposition processing according to Embodiment 6. The previously captured image disposition processing is a sub-flow of the image capturing processing. The previously captured image disposition processing in FIG. 15 exemplifies the detailed processing of step S901. In each step of FIG. 15, a processing step the same as FIG. 10 is denoted with the same reference sign, and description thereof is omitted.

In step S1501, the control unit 101 disposes the related previously captured images, which were acquired in step S1003, in each region of the template 401. Specifically, out of the related previously captured images, the control unit 101 acquires a number of related previously captured images that fill the open regions of the template 401, and dispose the acquired related previously captured images in the open regions of the template 401 respectively.

For example, in a case where there are three regions where a previously captured image is not disposed, as in the case of the screen example in FIG. 4C, the control unit 101 acquires three related previously captured images from the recording unit 108, and disposes these images in the open regions.

The control unit 101 controls such that the live image, which the user has already disposed, is not automatically replaced with a related previously captured image. The control unit 101 disposes the related previously captured images in the regions of the template 401 where the live image disposed by the user does not exist.

The control unit 101 may control such that the previously captured images, which the user has already disposed, are not automatically replaced with related previously captured images. The control unit 101 manages a flag to determine whether a previously captured image that is currently disposed was disposed by the user, or was automatically disposed by the control unit 101 in the processing in step S1501. For example, the control unit 101 attaches a "0" flag if a previously captured image that is currently disposed was disposed by the instruction from the user in step S1006, and attaches a "1" flag is this image was disposed by the control unit 101 in step S1501. By referring to the value of the flag, the control unit 101 can control such that the previously captured image disposed by the user (flag=0) is not replaced with a related previously captured image.

Further, the control unit 101 may change the display format of a previously captured image that is currently disposed, depending on whether the previously captured image that is currently disposed was disposed by the user, or was disposed by the control unit 101 in step S1501. By changing the display format, the user can easily discern whether a previously captured image that is currently disposed was disposed by the user, or was automatically disposed by the imaging apparatus 100. For example, the control unit 101 may change the display format by the color of the frame of each rectangular region of the template 401.

In a case where a number of related previously captured images is less than a number of open regions in the template 401, the control unit 101 may dispose only the related previously captured images acquired in step S1003. In this case, the control unit 101 may dispose the related previously captured images in sequence, from a region of which distance from the live image is shorter. By disposing the related previously captured images in sequence from a region of which distance from the live image is shorter, the user can more easily compare the live image and the previously captured images.

In Embodiment 6, the control unit 101 automatically disposes the related previously captured images, which were acquired based on the representative image selected by the user, in the template 401. Thereby the imaging apparatus 100 can reduce the steps that the user must take to select and dispose the previously captured images to be compared with the live image.

A related previously captured image, which the control unit 101 disposed in a region of the template 401 in step S1501, may be replaced with another previously captured image in step S1006 by user operation. Thereby in a case where a related previously captured image disposed by the control unit 101 is not a desired image, the user can replace this image with a desired previously captured image.

Embodiment 7

In a case of displaying images in a list, the image list can present a sense of consistency by disposing images having a same feature. The image list may also present a sense of consistency if an image having a first feature and an image having a second feature are disposed in regular order.

In Embodiment 6, related previously captured images having the same feature as the representative image selected by the user are automatically disposed in the regions of the template 401. In Embodiment 7, on the other hand, previously captured images of a plurality of groups having mutually different features are automatically disposed in regular order.

In Embodiment 7, previously captured images in a plurality of groups having different features can be automatically disposed in regular order. Therefore, the user can implement various types of list displays by a simple operation. The configuration of the imaging apparatus according to Embodiment 7 is the same as the imaging apparatus 100 according to Embodiment 1 indicated in FIG. 1. A processing step the same as Embodiment 6 is denoted with the same reference sign, and description thereof is omitted.

Image Capturing Processing According to Embodiment 7: The image capturing processing of the imaging apparatus 100 according to Embodiment 7 will be described with reference to FIGS. 9 and 15. Aspects that are different from the image capturing processing according to Embodiment 6 will be described in detail.

In S302 in FIG. 9, the control unit 101 receives instruction from the user to select a template in which the display positions of previously captured images in a group having a first feature and display positions of previously captured images in a group having a second feature can be specified. Hereafter the group having the first feature is referred to as a "first group", and the group having the second feature is referred to as a "second group".

Figure 16A:
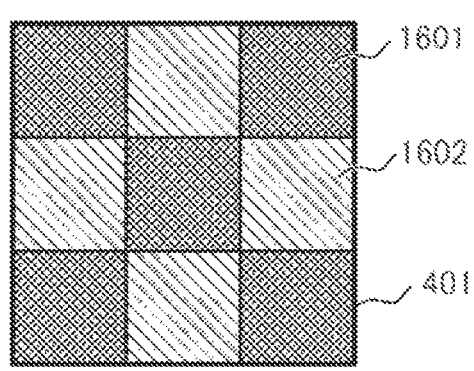
FIGS. 16A and 16B are diagrams exemplifying a template of display positions of the previously captured images according to Embodiment 7.
Figure 16B:
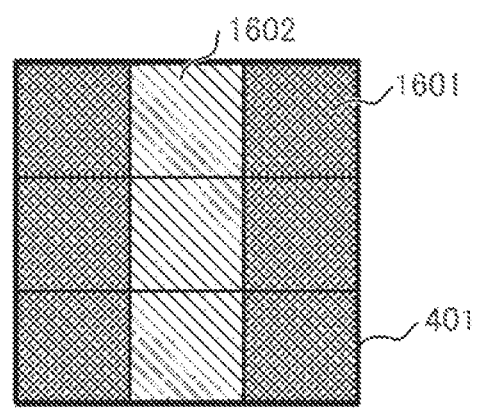

Examples of the template of the display positions of previously captured images will be described with reference to FIGS. 16A and 16B. FIGS. 16A and 16B are examples of templates of the display positions which the user can select. A plurality of regions included in each template are divided into a plurality of groups and are disposed in regular order.

In FIGS. 16A and 16B, each rectangular region 1601 (rectangular region that is filled) is a rectangular region in which an image in a first group is disposed among the rectangular regions indicating the display positions of the template 401. Each regular region 1602 (rectangular region that is shaded) is a rectangular region in which an image in a second group is disposed among the rectangular regions indicating the display positions of the template 401.

In FIG. 16A, the rectangular regions 1601 and the rectangular regions 1602 are disposed in regular order into a checkered pattern. In FIG. 16B, the rectangular regions 1601 and the rectangular regions 1602 are disposed in regular order into a vertical stripe pattern.

The control unit 101 displays the templates of the display positions as indicated in FIGS. 16A and 16B on the display unit 109, so as to present the templates to the user. The control unit 101 receives selection of a template from the user. The control unit 101 may make the display format of the rectangular regions 1601, where the images in the first group are displayed, different from the display format of the rectangular regions 1602, where the images in the second group are disposed. Thereby the user can easily discern the group to which each rectangular region belongs.

In step S1001 in FIG. 15, the control unit 101 receives the selection of the representative image from the user. For example, the user can move a desired representative image to one of the rectangular regions of the template 401 by the drag and drop operation. The control unit 101 detects the operation by the user, and disposes the representative image selected by the user in the region specified by the drag and drop operation. Thereby the control unit 101 can receive the selection and the disposition of the representative image by the user.

In step S1002 in FIG. 15, the control unit 101 determines whether the user selected a representative image. If a representative image was selected (step S1002: YES), the control unit 101 records the feature group of the rectangular region, where the representative image was disposed, in the recording unit 108, and processing advances to step S1003. If a representative image was not selected (step S1002: NO), processing advances to S1005.

In step S1501 in FIG. 15, the control unit 101 automatically disposes the related previously captured images acquired in step S1003 in the rectangular regions of the feature group that is the same as the feature group of the rectangular region where the representative image was disposed.

Figure 17A:
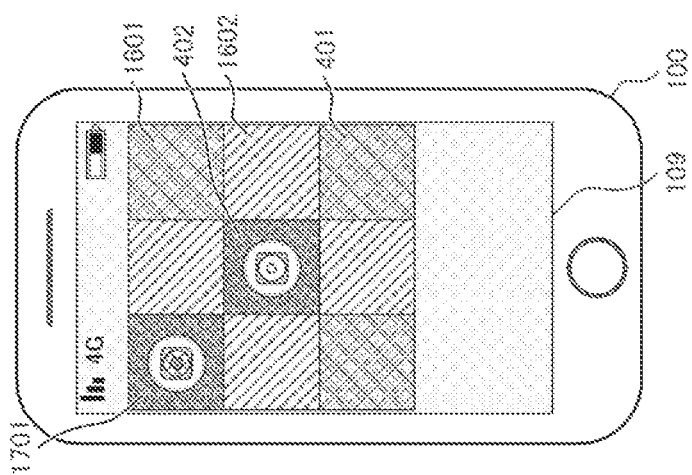
FIGS. 17A to 17C are diagrams exemplifying the live view display screens according to Embodiment 7.

An example of the live view display screen, on which the related previously captured images are disposed, will be described with reference to FIGS. 17A to 17C. FIG. 17A is an example where the template of the display positions indicated in FIG. 16A is selected in step S302. In the state in step S303, the live image is disposed in the rectangular region 402 at the center of the template 401. In the state in step S1001, the representative image 1701 is disposed in the upper left rectangular region of the template 401.

In step S1501, the control unit 101 reads the feature group of the rectangular region where the representative image 1701 is disposed, from the recording unit 108. In the case of FIG. 17A, the rectangular region where the representative image 1701 is disposed belongs to the first group. The control unit 101 disposes the related previously captured image acquired in step S1003 in the rectangular region at another display position belonging to the first group, which is the same feature group as the representative image.

Figure 17B:
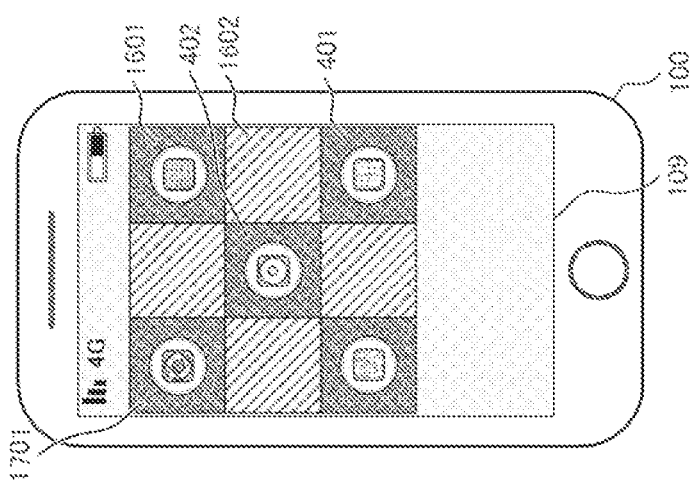

FIG. 17B exemplifies a state where the control unit 101 disposed the related previously captured images in the rectangular regions at the other display positions belonging to the first group in the state of FIG. 17A. The control unit 101 controls such that the representative image and the live image disposed by the user are not replaced with the related previously captured images.

Figure 17C:
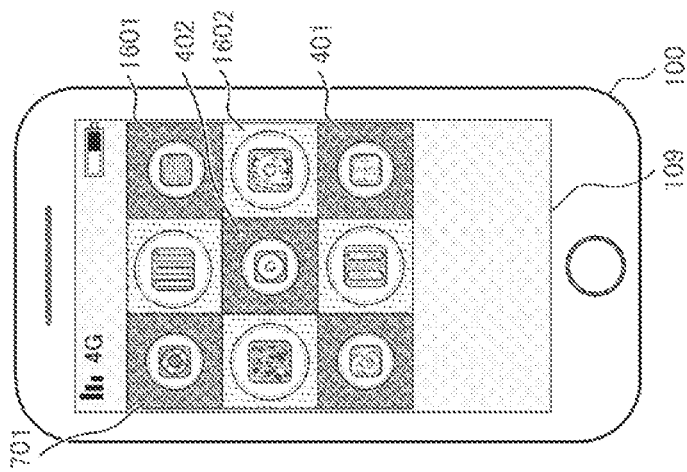

FIG. 17C is an example where the processing steps from step S1001 to step S1501 are repeated again, and the representative image and related previously captured images in FIG. 17B are disposed in the rectangular regions in the second group as well. In this way, the control unit 101 can configure a live view display screen where the features of images are consistent in each feature group.

In Embodiment 7, the control unit 101 can easily dispose the previously captured images in a plurality of groups having mutually different features in the template 401. Thereby the imaging apparatus 100 can reduce the steps that the user must take to dispose the previously captured images in a plurality of feature groups in regular order to be compared with the live image.

The control unit 101 may determine the conditions of the feature of the images disposed in the rectangular regions in the second group, based on the feature of the images in the first group. The conditions of the images disposed in the rectangular regions in the second group are, for example, a condition that the subject in the composition is smaller than the composition of the images in the first group, or that the tinge is compatible with the tinge of the images in the first group in terms of color scheme.

The control unit 101 may also select the previously captured images belonging to each feature group based on the information on a tag related to the feature of the image. Thereby the imaging apparatus 100 can reduce the steps that the user must take to dispose the previously captured images in a plurality of feature groups in regular order to be compared with the live image.

Embodiment 8

In Embodiment 8, the size of each display region (each region of the template) of the previously captured images and the live image is adjusted so that details of the live image (e.g. focus, angle of view) can be more easily checked. While checking the details of the live image, the user can adjust the composition, brightness and tinge of the live image in accordance with the previously captured images before capturing the live image.

The configuration of the imaging apparatus according to Embodiment 8 includes an acceleration sensor to measure the moving speed of the imaging apparatus 100, in addition to the configuration of the imaging apparatus 100 according to Embodiment 1 in FIG. 1. The characteristic processing according to Embodiment 8 will be described with reference to FIG. 18 and FIGS. 19A to 19F, and description on operation and processing steps the same as Embodiment 1 is omitted.

Image Capturing Processing According to Embodiment 8:
The image capturing processing of the imaging apparatus 100 according to Embodiment 8 will be described with reference to FIG. 18. The processing steps of the image capturing processing according to Embodiment 8 are the same as the flow chart in FIG. 3, except for step S1801, hence the same processing step is denoted with the same reference sign, and description thereof is omitted.

In step S1801, the control unit 101 receives an operation to adjust the image capturing conditions, so that the disposed previously captured images and the live image have the same composition, brightness and tinge. The control unit 101 also receives an operation for the user to check the details of the live image, such as focus and angle of view.

The image capturing condition is an image processing condition to change the composition, exposure conditions, colors, gradation or the like. As an example of adjusting the image capturing condition, a method of adjusting the composition will be described with reference to FIGS. 5A and 5B.

FIGS. 5A and 5B are examples of the live view display screen in a case where eight previously captured images are selected and disposed in step S304. In FIGS. 5A and 5B, a zoom bar 501 is a UI for changing the zoom factor of the live image, and is a UI for capturing an image by pressing or touching the image capturing button 502.

In the live view display screen in FIG. 5A, a slice of bread in the live image disposed in the rectangular region 402 is displayed at a size that is smaller than the slices of bread of the previously captured images surrounding the live image. If the image is captured in this state, the subject size is different between the live image and the previously captured images, hence the list display of these images does not provide a sense of consistency, which is not desirable.

In order to match the subject size of the live image with the subject sizes of the previous captured images, the user performs an operation to increase the zoom factor of the live image. In the case of the live view display screen in FIG. 5B, the user can increase the zoom factor by moving the tab of the zoom bar 501 in the + direction, in order to increase the subject size of the live image. By the zoom operation, the subject size of the live image, which was smaller than the subject sizes of the previously captured images surrounding the live image in FIG. 5A, is increased to the same subject size as the subject sizes of the previously captured images surrounding the live image, as indicated in FIG. 5B.

By changing the zoom factor, the subject sizes of the plurality of images become similar, and the list display of the plurality of images on the live view display screen after the image capturing becomes a list display having a sense of consistency.

Figure 19A:
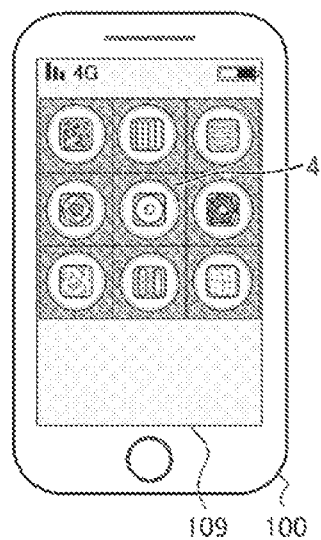
FIGS. 19A to 19F are diagrams exemplifying the live view display screens according to Embodiment 8.

As an example of checking the details of the live image, a method of checking the focus of the live view image will be described with reference to FIGS. 19A to 19C. FIG. 19A is an example of a live view display screen where the live image is disposed at the center, and the eight previously captured images are disposed surrounding the live image. In FIG. 19A, the sizes of the display regions of the live image and the previously captured images are the same. Making the sizes of the display regions of the live image and the previously captured images the same is appropriate for adjustment to provide a sense of consistency.

However, at each size of the equally divided regions, it is difficult to check whether or not the live image is focused, and the user may capture a defocused image. In order to easily check the focus of the live image, the control unit 101 may receive the Pinch-Out operation from the user, for example, and increase the rectangular region 402 to display the live image, as indicated in the live view display screens in FIGS. 19B and 19C. Thereby it becomes easier to check whether or not the live image is focused.

The user performs the Pinch-In operation when the focus is checked. When the Pinch-In operation is received from the user, the control unit 101 returns the size of the rectangular region 402, where the live image is displayed, back to the original size, as indicated in the live view display screen in FIG. 19A. By changing the display size of the live image in accordance with the user operation, the user can easily check the focus.

A method of checking the angle of view will be described with reference to FIGS. 19B and 19C. For example, in a case where the user is moving the imaging apparatus 100 at a predetermined threshold or higher speed, the control unit 101 determines that the user is checking a general angle of view of the live image. The speed of the imaging apparatus 100 can be measured by the acceleration sensor included in the imaging apparatus 100.

Figure 19B:
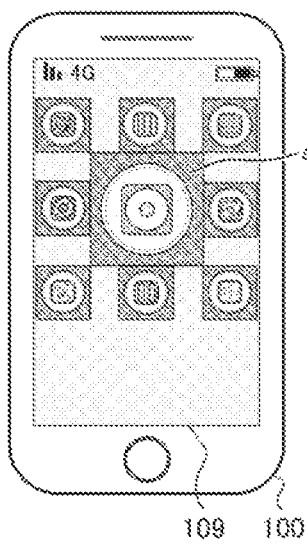
Figure 19C:
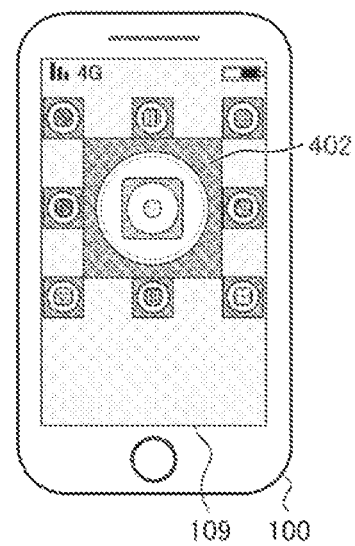
Figure 19D:
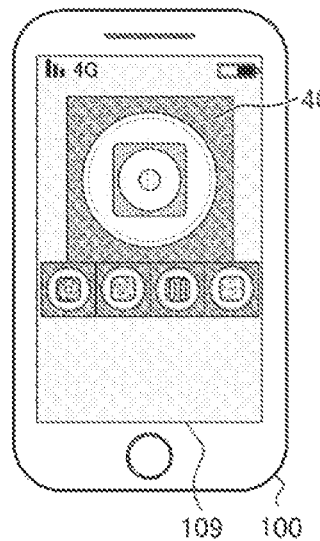
Figure 19E:
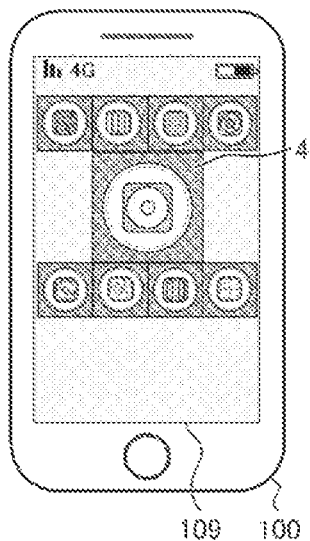
Figure 19F:
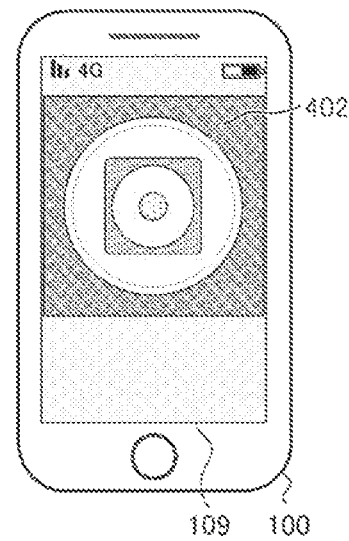

If it is determined that the user is checking the angle of view of the live image, the control unit 101 automatically increases the size of the rectangular region 402 displaying the live image, as indicated in FIGS. 19B and 19C. By changing the display size of the live image, the user can easily check the angle of view.

When the speed of the imaging apparatus 100 becomes less than the predetermined threshold, the control unit 101 determines that checking of the angle of view by the user ended. If it is determined that checking of the angle of view by the user ended, as indicated in the live view display screen in FIG. 19A the control unit 101 automatically returns the size of the rectangular region 402 displaying the live image back to the original size. By changing the size of the rectangular region 402 displaying the live image in accordance with the speed of the imaging apparatus 100, the user can easily check the general angle of view.

In Embodiment 8, the control unit 101 adjusts the size of the rectangular region 402, displaying the live image, in step S1801, so that the user can check the details of the live image. Thereby the user can easily check the details of the live image, such as the focus and general angle of view.

In the case of increasing the size of the rectangular region 402 displaying the live image, a number of previously captured images and disposition thereof in the live view display screens in FIGS. 19B and 19C are the same as FIG. 19A, but the present invention is not limited to this. For example, in the example in FIG. 19D, the live image is displayed in a magnified state, and a part of the previously captured images are displayed side-by-side below the live image in a demagnified state. In the example in FIG. 19E, the live image is displayed at the center in a magnified state, and the previously captured images are displayed side-by-side above and below the live image in a demagnified state. In the example in FIG. 19F, the live image is displayed at the center in a magnified state, and the previously captured images are not displayed. As exemplified in FIGS. 19D and 19F, a number of previously captured images and disposition thereof may be freely changed in accordance with the size of the live image.

OTHER EMBODIMENTS

Embodiment 1 to Embodiment 8 (including modifications) are merely examples, and the configurations implemented by appropriately modifying or changing the configuration of each embodiment within a scope of the essence of the present invention are included in the present invention. The configurations implemented by appropriately combining the configuration of each embodiment are also included in the present invention.

For example, Embodiment 1 to Embodiment 8 can be combined with Embodiment 2. In this case, the imaging apparatus 100 displays the live image and the previously captured images acquired from an external server (e.g. SNS) on the live view display screen during image capturing.

Specifically, in the case of combining Embodiment 8 and Embodiment 2, the imaging apparatus 100 displays the previously captured images acquired from the external server on the display unit 109, along with the live image. The imaging apparatus 100 adjusts the size of the region displaying the live image so that the user can check the details of the live image. The user can adjust the composition, brightness and tinge of the live image in accordance with the previously captured images acquired from the external server, and capture the live image.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, an image group, including a plurality of images having a sense of consistency, can be easily generated.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-107743, filed on Jun. 23, 2020 and Japanese Patent Application No. 2021-010633, filed on Jan. 26, 2021, which are hereby incorporated by reference herein in their entirety.

What is claimed is:

1. An imaging apparatus comprising at least one memory and at least one processor which function as:
    a display unit configured to display on a display a live image of a subject and a plurality gf previously captured images;
    an image capturing unit configured to capture an image of the subject;
    a changing unit configured to change image capturing conditions of the subject based on the plurality of the previously captured images displayed with the live image of the subject on the display, wherein the display unit displays the live image of the subject, which has been captured by using the image capturing conditions changed by the changing unit, with the plurality of the previously captured images on the display; and a recording unit configured to record in a recording medium the captured image of the subject which has been captured by the image capturing unit and the plurality of the previously captured images in association with disposition information which includes a display position of the captured image of the subject and display positions of each of the plurality of the previously captured images.

2. The imaging apparatus according to claim 1, wherein the at least one memory and the at least one processor further function as:

a determination unit configured to determine each display position of the live image of the subject and the previously captured images.

3. The imaging apparatus according to claim 1, wherein the display unit is configured to adjust the live image of the subject in accordance with the image capturing conditions changed by the changing unit, and to display the adjusted live image on the display.

4. The imaging apparatus according to claim 1, wherein the image capturing conditions include at least one of a condition related to focal distance, a condition related to subject distance, a condition related to depth of focus, and a condition related to exposure.

5. The imaging apparatus according to claim 1, wherein the display unit is configured to display on the display the captured image of the subject and the plurality of the previously captured images, based on the disposition information.

6. The imaging apparatus according to claim 1, wherein the at least one memory and the at least one processor further function as:

an upload unit configured to upload the captured image of the subject and the plurality of the previously captured images to an external server, along with the disposition information recorded in the recording medium.

7. The imaging apparatus according to claim 1, wherein the display position of the captured image of the subject and the display positions of each of the plurality of the previously captured images are regions selected respectively from a plurality of regions which are divided in advance.

8. The imaging apparatus according to claim 1, wherein the plurality of the previously captured images are images selected from images acquired from the recording medium.

9. The imaging apparatus according to claim 1, wherein the plurality of the previously captured images are images selected from images acquired from an external server.

10. The imaging apparatus according to claim 9, wherein the at least one memory and the at least one processor further function as:

a transmission unit configured to transmit the disposition information including the display position of the captured image of the subject and the display positions of each of the plurality of the previously captured images to the external server.

11. The imaging apparatus according to claim 10, wherein the display unit is configured to display on the display the captured image of the subject and the plurality of the previously captured images, based on the disposition information acquired from the external server.

12. The imaging apparatus according to claim 1, wherein the display unit is configured to display on the display related previously captured images, which are acquired based on a feature of a representative image selected by the user, as candidates of the plurality of the previously captured images.

13. The imaging apparatus according to claim 12, wherein the display unit is configured to display on the display a template, which is divided into a plurality of regions to display the live image of the subject and the plurality of the previously captured images, and to dispose automatically a previously captured images, which are selected from the related previously captured images, in regions in which the live image of the subject and the plurality of the previously captured images are not disposed, out of the plurality of regions.

14. The imaging apparatus according to claim 13, wherein the plurality of regions of the template are divided into a plurality of groups, and the display unit is configured to dispose automatically the previously captured images, which are selected from the related previously captured images acquired for each of the groups, in corresponding regions of the group.

15. The imaging apparatus according to claim 1, wherein the display unit is configured to display on the display related previously captured images, which are acquired based on an acquisition condition specified by the user, as candidates of the plurality of the previously captured images.

16. The imaging apparatus according to claim 1, wherein the display unit is configured to display on the display related captured images, which are acquired based on a feature of the live image of the subject, as candidates of the plurality of the previously captured images.

17. The imaging apparatus according to claim 1, wherein the display unit is configured to change a display size of the live image of the subject, based on an operation by the user or a moving speed of the imaging apparatus.

18. A method of controlling an imaging apparatus, the method comprising:

a display step of displaying on a display a live image of a subject and a plurality of previously captured images;

an image capturing step of capturing an image of the subject;

a changing step of changing image capturing conditions of the subject based on the plurality of the previously captured images displayed with the live image of the subject on the display, wherein the live image of the subject, which has been captured by using the image capturing conditions changed in the changing step, is displayed with the plurality of the previously captured images on the display; and a recording step of recording in a recording medium the captured image of the subject which has been captured in the image capturing step and the plurality of the previously captured images in association with disposition information which includes a display position of the captured image of the subject and display positions of each of the plurality of the previously captured images.

19. A non-transitory computer-readable medium that stores a program for causing a computer to execute:

a display step of displaying on a display a live image of a subject and a plurality of previously captured images;

an image capturing step of capturing an image of the subject;

a changing step of changing image capturing conditions of the subject based on the plurality of the previously captured images displayed with the live image of the subject on the display, wherein the live image of the subject, which has been captured by using the image capturing conditions changed in the changing step, is displayed with the plurality of the previously captured images on the display; and a recording step of recording in a recording medium the captured image of the subject which has been captured in the image capturing step and the plurality of the previously captured images in association with disposition information which includes a display position of the captured image of the subject and display positions of each of the plurality of the previously captured images.

\* \* \* \* \*